(12) United States Patent
Khann et al.

(10) Patent No.: US 9,923,979 B2
(45) Date of Patent: Mar. 20, 2018

(54) SYSTEMS AND METHODS OF DETERMINING A GEOGRAPHIC LOCATION BASED CONVERSION

(71) Applicant: Google Inc., Mountain View, CA (US)

(72) Inventors: Amit Khann, Mountain View, CA (US); Philip Andrew McDonnell, San Francisco, CA (US); Prashast Khandelwal, Mountain View, CA (US); Puneet Gupta, Mountain View, CA (US); Shibani Sanan, Mountain View, CA (US); Shun Kawamura, Mountain View, CA (US); Subhadip Sarkar, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 472 days.

(21) Appl. No.: 13/929,217

(22) Filed: Jun. 27, 2013

(65) Prior Publication Data

US 2015/0006712 A1    Jan. 1, 2015

(51) Int. Cl.
*G06F 15/173* (2006.01)
*H04L 29/08* (2006.01)

(52) U.S. Cl.
CPC .............. *H04L 67/22* (2013.01); *H04L 67/18* (2013.01)

(58) Field of Classification Search
CPC ..................................................... H04L 67/22
See application file for complete search history.

(56) References Cited

U.S. PATENT DOCUMENTS 8,311,845 B2    11/2012    Vengroff et al.
8,429,013 B2    4/2013    Symons et al.
(Continued)

FOREIGN PATENT DOCUMENTS

WO    WO-2007/117811    10/2007

OTHER PUBLICATIONS

Giovanni Iachello, Ian Smith, Sunny Consolvo, Gregory D. Abowd, Jeff Hughes, James Howard, Fred Potter, James Scott, Timothy Sohn, Jeffrey Hightower, Anthony LaMarca. 2005. Control, Deception, and Communication: Evaluating the Deployment of a Location-Enhanced Messaging Service. In 7th International Conference, UbiComp 2005, Tokyo, Japan, Sep. 11-14, 2005. Proceedings, 213-231. DOI= 10.1007/11551201_13.
(Continued)

*Primary Examiner* — Jason Recek
(74) *Attorney, Agent, or Firm* — Foley & Lardner LLP; John D. Lanza

(57) ABSTRACT

Systems and methods of determining a geographic location based conversion via a computer network. A data processing system can receive, from a computing device, an indication of interest in an online content item that is associated with a commercial entity having a location. The system can also receive data points that each include time information and location information of a computing device. The system can generate a valid cluster indicating an activity at the location of the commercial entity by evaluating the time information and the location information of two or more data points with a duration threshold and a location threshold. The system can use the valid cluster to identify the indication of interest in the online content item as the location based conversion based on the activity at the location of the commercial entity.

21 Claims, 9 Drawing Sheets

(56) References Cited

U.S. PATENT DOCUMENTS

| | | | |
|---|---|---|---|
| 2002/0102988 A1 | 8/2002 | Myllymaki | |
| 2007/0005990 A1* | 1/2007 | Sathish | H04L 67/14 713/189 |
| 2007/0281716 A1 | 12/2007 | Altman et al. | |
| 2008/0248815 A1* | 10/2008 | Busch | H04W 4/02 455/456.5 |
| 2008/0250447 A1* | 10/2008 | Rowe | G06Q 30/02 725/32 |
| 2009/0248607 A1* | 10/2009 | Eggink | G06F 17/3087 706/54 |
| 2010/0256948 A1* | 10/2010 | Wright | G06Q 10/087 702/150 |
| 2012/0221725 A1* | 8/2012 | Schroeder, Jr. | G06F 9/468 709/225 |
| 2013/0344898 A1* | 12/2013 | Hawkins | H04W 4/02 455/456.3 |
| 2015/0154632 A1* | 6/2015 | Jindal | G06Q 30/0277 705/14.45 |

OTHER PUBLICATIONS

Giovanni Iachello, Ian Smith, Sunny Consolvo, Mike Chen, and Gregory D. Abowd. 2005. Developing privacy guidelines for social location disclosure applications and services. In Proceedings of the 2005 symposium on Usable privacy and security (SOUPS '05). ACM, New York, NY, USA, 65-76. DOI=http://dx.doi.org/10.1145/1073001.1073008.
Anita Wilhelm, Yuri Takhteyev, Risto Sarvas, Nancy Van House, and Marc Davis. 2004. Photo annotation on a camera phone. In CHI '04 Extended Abstracts on Human Factors in Computing Systems (CHI EA '04). ACM, New York, NY, USA, 1403-1406. DOI=http://dx.doi.org/10.1145/985921.986075.
Donald J. Patterson, Xianghua Ding, Nicholas Noack. 2006. Nomatic: Location by, for, and of crowds. Proceedings of International Workshop on Location- and Context-Awareness LoCA 2006. 186-203. DOI=10.1007/11752967_13.
Ian Smith, Sunny Consolvo, Anthony Lamarca, Jeffrey Hightower, James Scott, Timothy Sohn, Jeff Hughes, Giovanni Iachello, Gregory D. Abowd. 2005. Social Disclosure of Place: From Location Technology to Communication Practices. Third International Conference, Pervasive 2005. 134-151. DOI=10.1007/11428572_9.
Ian Smith. 2005. Social-Mobile Applications. Computer 38, 4 (Apr. 2005), 84-85. DOI=http://dx.doi.org/10.1109/MC.2005.140.
Juhong Liu, O. Wolfson and Huabei Yin. 2006. Extracting Semantic Location from Outdoor Positioning Systems. 7th International Conference on Mobile Data Management. doi: 10.1109/MDM.2006.87.
Marc Davis, Michael Smith, Fred Stentiford, Adetokunbo, John Canny, Nathan Good, Simon King, Rajkumar Janakiraman. 2006. Using context and similarity for face and location identification. In Proceedings of the IS&T/SPIE 18th Annual Symposium on Electronic Imaging Science and Technology.
Marc Davis, Nancy Van House, Jeffrey Towle, Simon King, Shane Ahern, Carrie Burgener, Megan Finn, Vijay Viswanathan, Matthew Rothenberg. 2005. MMM2: Mobile Media Metadata for Media Sharing. In Extended Abstracts of the Conference on Human Factors in Computing Systems. ACM, New York, NY, USA, 1335-1338.
Marc Davis, Simon King, Nathan Good, and Risto Sarvas. 2004. From context to content: leveraging context to infer media metadata. In Proceedings of the 12th annual ACM international conference on Multimedia (Multimedia '04). ACM, New York, NY, USA, 188-195. DOI=http://dx.doi.org/10.1145/1027527.1027572.
Risto Sarvas, Erick Herrarte, Anita Wilhelm, and Marc Davis. 2004. Metadata creation system for mobile images. In Proceedings of the 2nd international conference on Mobile systems, applications, and services (MobiSys '04). ACM, New York, NY, USA, 36-48. DOI=http://dx.doi.org/10.1145/990064.990072.
Takashi Yoshino, Tomohiro Muta and Jun Munemori. 2002. NAMBA: location-aware collaboration system for shopping and meeting. IEEE Transactions on Consumer Electronics, vol. 48, No. 3. 470-477. doi: 10.1109/TCE.2002.1037030.
"Walmart and Google to offer voice-enabled shopping", BBC News, Aug. 23, 2017 (10 pages).
Amazon, "Echo Look | Hands-Free Camera and Style Assistant", reprinted from https://www.amazon.com/gp/product/B0186JAEWK?ref%5F=cm%5Fsw%5Fr%5Ffa%5Fdp%5Ft2%5FC5oazbJTKCB18&pldnSite=1 on Aug. 22, 2017 (7 pages).
Broussard, Mitchel, "Chatbot-Like Siri Patent Includes Intelligent Image, Video, and Audio Recognition within Messages", MacRumors, May 11, 2017 (7 pages).
Chen, Lulu Yilun, "Alibaba Challenges Google, Amazon With New Echo-Like Device", Bloomberg Technology, Jul. 5, 2017 (3 pages).
Clover, Juli, "Amazon and Google Want to Turn Their Smart Home Speakers Into Telephone Replacements", MacRumors, Feb. 15, 2017 (5 pages).
Collins, et al., "Can Twitter Save Itself?", cnet, Apr. 26, 2017, reprinted from https://www.cnet.com/news/twitter-q1-2017-earnings/ on Aug. 22, 2017 (2 pages).
Crist, Ry, "Logitech Harmony's Alexa Skill just got a whole lot better", cnet, Jul. 13, 2017 (2 pages).
Forrest, Conner, "Essential Home wants to be bridge between Amazon's Alexa, Apple's Siri, and Google Assistant", TechRepublic, May 31, 2017 (10 pages).
Foxx, Chris, "Apple reveals HomePod smart speaker", BBC News, Jun. 5, 2017 (6 pages).
Gebhart, Andrew, "Google Assistant is spreading, but it needs its own Echo Dot", cnet, May 20, 2017 (7 pages).
Gebhart, Andrew, "Google Home to the Amazon Echo: 'Anything you can do . . .'", cnet, May 18, 2017 (7 pages).
Gibbs, Samuel, "Your Facebook Messenger app is about to be filled with ads", The Guardian, Jul. 12, 2017 (3 pages).
Google Developers, "GoogleAssistant SDK" reprinted from https://developers.google.com/assistant/sdk/ on Aug. 22, 2017 (4 pages).
Gurma, et al., "Apple Is Manufacturing a Siri Speaker to Outdo Google and Amazon", Bloomberg, May 31, 2017 (5 pages).
Hardwick, Tim, "Facebook Smart Speaker Coming Next Year With 15-inch Touch Panel", MacRumors, Jul. 25, 2017 (5 pages).
Kelion, Leo, "Amazon's race to make Alexa smarter", BBC News, Jul. 28, 2017 (8 pages).
Koetsier, John, "Ads on Amazon Echo: Wendy's, ESPN, And Progressive Among Brands Testing", Forbes, May 11, 2017 (2 pages).
Larson, Selena, "Google Home now recognizes your individual voice", CNN Money, San Francisco, California, Apr. 20, 2017 (3 pages).
Lee, Dave, "The five big announcements from Google I/O", BBC News, May 18, 2017 (9 pages).
Nieva, Richard, "Google Home and eBay can tell you how much that's worth", cnet, Mar. 8, 2017 (3 pages).
Patently Apple, "Apple Patent Reveals a New Security Feature Coming to Siri", Apr. 4, 2017, reprinted from http://www.patentlyapple.com/patently-apple/2017/04/apple-patent-reveals-a-new-security-feature-coming-to-siri.html, on Aug. 22, 2017 (6 pages).
Patently Apple, "Today Google Home's Virtual Assistant can learn its Owner's voice for Security Reasons like Apple's Patent Pending Idea", Apr. 20, 2017, reprinted from http://www.patentlyapple.com/patently-apple/2017/04/today-google-homes-virtual-assistant-can-learn-its-owners-voice-for-security-reasons-like-apples-patent-pending-idea.html on Aug. 22, 2017 (4 pages).
Patently Mobile, "The Patent behind Google Home's new Feature of Understanding Different Voices in the Home Surfaced Today", Apr. 20, 2017, reprinted from http://www.patentlymobile.com/2017/04/the-patent-behind-google-homes-new-feature-of-understanding-different-voices-in-the-home-surfaced-today.html, on Aug. 22, 2017 (3 pages).
Perez, Sarah, "The first ad network for Alexa Skills shuts down following Amazon's policy changes", Tech Crunch, Jun. 15, 2017 (6 pages).
Porter, Jon, "Amazon Echo Show release date, price, news and features", Techradar, Jun. 26, 2017 (14 pages).

(56) References Cited

OTHER PUBLICATIONS

Sablich, Justin, "Planning a Trip With the Help of Google Home", New York Times, May 31, 2017 (6 pages).
Seifert, Dan, "Samsung's new virtual assistant will make using your phone easier", The Verge, Mar. 20, 2017 (6 pages).
Sherr, Ian, "IBM built a voice assistant for cybersecurity", cnet, Feb. 13, 2017 (2 pages).
Siegal, Daniel, "IP Attys Load Up Apps' Legal Challenges At 'Silicon Beach'", Law360, Los Angeles, California, Feb. 2, 2017 (4 pages).
Smith, Dave, "The Amazon Echo got 2 incredibly useful features thanks to a new update", Business Insider, Jun. 1, 2017 (5 pages).
Willens, Max, "For publishers, Amazon Alexa holds promise but not much money (yet)", Digiday, Jul. 6, 2017 (6 pages).

\* cited by examiner

SYSTEMS AND METHODS OF DETERMINING A GEOGRAPHIC LOCATION BASED CONVERSION

BACKGROUND

In a networked environment such as the internet, web publishers such as people or companies can provide information for display on web pages or other documents. The web pages can include text, video, or audio information provided by the entities via a web page server for display on the internet. Content providers, such as third party advertisers, can provide additional content for display on the web pages together with the information provided by the web publishers. A content selection server may select certain additional content to display on a rendering of a web page based on various factors including, e.g., content selection criteria associated with the content to be displayed. Thus, a person viewing a web page can access the information that is the subject of the web page, as well as selected third party content that may appear with the web page.

SUMMARY

At least one aspect is directed to a method of generating a valid cluster based on a location of a commercial entity via a computer network. The method can be performed by a data processing system that includes at least one processor executing on a server. In one implementation, the method includes the data processing system receiving from an online content selection data structure, the location of the commercial entity. The method can include the data processing system receiving a plurality of data points that each comprise location information and time information associated with a user device. The data processing system can receive the plurality of data points via a computer network from a remote user device associated with a user identifier. The method can include the data processing system generating a plurality of location clusters. Each of the plurality of location clusters can include a first data point of the plurality of data points and subsequent data points that, as indicated by the location information of the first data point and the subsequent data points, are within a threshold distance from the first data point. The data processing system can generate the plurality of location clusters based on the location information. The method can include the data processing system determining a cluster duration for each of the plurality of location clusters by evaluating the time information associated with data points of each of the plurality location clusters. The method can include the data processing system comparing the cluster duration for each of the plurality of location clusters with a duration threshold to identify a set of valid location clusters that satisfy the duration threshold. The method can include the data processing system filtering the set of valid clusters based on a proximity to the location of the commercial entity to identify the valid cluster. The valid cluster can indicate an activity at the commercial entity.

The data processing system can identify a conversion associated with computer network activity of the remote user device and with the activity at the commercial entity. For example, the computer network activity may include a click, selection, or impression on a content item and activity at the commercial entity may include a visit to the commercial entity.

The data processing system can receive location information based on at least one of GPS information, IP address of a wireless router, and cell phone tower triangulation, and the data processing system can also optimize the duration threshold using a histogram analysis technique. The data processing system can filter the set of valid clusters based on the proximity to the location of the commercial entity, and can filter the set of valid clusters to identify a plurality of valid clusters indicating multiple visits to the commercial entity. The data processing system can also determine that a location of a first subsequent data point is within the threshold distance to generate a first location cluster, and can determine that a location of a second subsequent data point exceeds the threshold distance to generate a second location cluster.

The threshold distances can include a first threshold distance and a second threshold distance. The data processing system can generate a first location cluster with a first data point of the plurality of data points and first subsequent data points that are within the first threshold distance from the first data point. The data processing system can generate a second location cluster with a second data point of the plurality of data points and second subsequent data points that are within the second threshold distance from the first data point.

The duration threshold can include a first duration threshold and a second duration threshold. The data processing system can generate a first location cluster with a first data point of the plurality of data points and first subsequent data points that are within the first threshold distance from the first data point. The data processing system can generate a second location cluster with a second data point of the plurality of data points and second subsequent data points that are within the second threshold distance from the first data point.

The data processing system can filter the set of valid clusters based on a proximity to the location of the commercial entity to identify a plurality of valid clusters, and can determine that the duration of the plurality of valid clusters exceeds the duration threshold to invalidate the plurality of location clusters. The data processing system can also receive the plurality of data points at a predetermined time interval.

At least one aspect is directed to a system for generating a valid cluster based on a location of a commercial entity. The system can include a data processing system. The data processing system can include at least one processor. In one implementation, the data processing system can be configured to receive, from an online content selection data structure, the location of the commercial entity. The data processing system can receive, via a computer network from a remote user device associated with a user identifier, a plurality of data points that each comprise location information and time information associated with the user device. The data processing system can generate, based on the location information, a plurality of location clusters, each of the plurality of location clusters comprising a first data point of the plurality of data points and subsequent data points of the plurality of data points that are within a threshold distance from the first data point. The data processing system can determine a cluster duration for each of the plurality of location clusters by evaluating the time information associated with data points of each of the plurality location clusters. The data processing system can compare the cluster duration for each of the plurality of location clusters with a duration threshold to identify a set of valid clusters that satisfy the duration threshold. The data processing system can filter the set of valid clusters based on a proximity to the location of the commercial entity to identify the valid cluster, the valid cluster indicating an activity at the commercial entity.

At least one aspect is directed to a non-transitory computer-readable medium comprising processor executable instructions to generate a valid cluster based on a location of a commercial entity. In one implementation, the instructions include instructions to receive, from an online content selection data structure, the location of the commercial entity. The instructions can include instructions to receive, via a computer network from a remote user device associated with a user identifier, a plurality of data points that each comprise location information and time information associated with the user device. The instructions can include instructions to generate, based on the location information, a plurality of location clusters, each of the plurality of location clusters comprising a first data point of the plurality of data points and subsequent data points that are within a threshold distance from the first data point. The instructions can include instructions to determine a cluster duration for each of the plurality of location clusters by evaluating the time information associated with data points of each of the plurality location clusters. The instructions can include instructions to compare the cluster duration for each of the plurality of location clusters with a duration threshold to identify a set of valid clusters that satisfy the duration threshold. The instructions can include instructions to filter the set of valid clusters based on a proximity to the location of the commercial entity to identify the valid cluster, the valid cluster indicating an activity at the commercial entity.

At least one aspect is directed to a method of determining a geographic location based conversion via a computer network. In one implementation, the method includes a data processing system receiving an indication of interest in an online content item. The data processing system can receive the indication from a first computing device. The online content item can be associated with a commercial entity having a location identified in an online content selection data structure. The method includes the data processing system correlating the online content item with an identifier associated with an application executing on the first computing device. The method includes the data processing system receiving, via the computer network from one of the first computing device and a second computing device, a plurality of data points that each comprise location information and time information of one of the first computing device and the second computing device. The method includes the data processing system generating a valid cluster indicating an activity at the location of the commercial entity. The valid cluster can be based on evaluation of the time information and the location information of a first data point of the plurality of data points with time information and location information of second data points of the plurality of data points with a duration threshold and a location threshold. The method includes the data processing system using the valid cluster to identify the indication of interest in the online content item as the location based conversion based on the activity of the commercial entity.

The data processing system can receive, from one of the first computing device and the second computing device, the plurality of data points via the application executing on one of the first computing device and the second computing device. The data processing system can also receive, via the computer network from the second computing device, the plurality of data points that each comprise location information of the second computing device. The data processing system can also receive, via the computer network from the first computing device, an indication of at least one of a click or an impression. The data processing system can transmit, responsive to a received indication of interest, via the computer network to the first computing device, a request for the identifier. Responsive to the request, the data processing system can receive the identifier from the first computing device.

The data processing system can generate a plurality of valid clusters indicating the activity at the location of the commercial entity to determine a plurality of occurrences of the activity at the location of the commercial entity. The data processing system can identify the indication of interest in the online content item as multiple location based conversions per indication of interest.

The data processing system can receive, via the computer network from one of the first computing device and the second computing device, the initial data point. The initial data point can include location information and time information. The data processing system can compare a location of a subsequent data point of the plurality of data points with location information of the initial data point to determine that the subsequent data point satisfies a location threshold. The data processing system can compare a time of the subsequent data point of the plurality of data points with time information of the initial data point to determine that the subsequent data point satisfies a duration threshold. The data processing system can also generate, by the data processing system and based on the location information, the valid cluster indicating a visit to the commercial entity.

The data processing system can aggregate, for several identifiers, several identified location based conversions. The data processing system can also determine that the plurality of identified location based conversions satisfies a privacy threshold. The data processing system can generate a report indicating a location based conversion rate for the online content item. The data processing system can also identify a keyword associated with the online content item, and can generate the report for the keyword.

The data processing system can receive, from a plurality of first devices, a plurality of indications of interest in a plurality of online content items of the commercial entity. The plurality of indications of interest can be associated with a plurality of identifiers. The data processing system can aggregate, for the plurality of identifiers, a plurality of identified location based conversions. The data processing system can determine that the plurality of identified location based conversions satisfy a privacy threshold, and can generate a report indicating a location based conversion rate for the plurality of online content items of the commercial entity. The data processing system can identify a false indication of interest in the online content, and can filter out an identifier associated with the false indication of interest.

At least one aspect is directed to a system for determining a geographic location based conversion via a computer network. The system includes a data processing system that includes at least one processor. In one implementation, the data processing system can be configured to receive, via a computer network from a first computing device, an indication of interest in an online content item. The online content item can be associated with a commercial entity having a location identified in an online content selection data structure. The data processing system can correlate the online content item with an identifier associated with an application executing on the first computing device. The data processing system can receive, via the computer network from one of the first computing device and a second computing device, a plurality of data points that each comprise time information and location information of one of the first computing device and the second computing device. The data processing system can generate a valid cluster indicating an activity at the location of the commercial entity. The valid cluster can be based on respective comparisons of time information and location information of a first data point of the plurality of data points and the time information and location information of second data points of the plurality of data points with a duration threshold and a location threshold. The data processing system can identify the indication of interest in the online content item as the location based conversion based on the activity at the commercial entity.

At least one aspect is directed to a non-transitory computer-readable medium including processor executable instructions to determine a geographic location based conversion via a computer network. In one implementation, the instructions include instructions to receive, via a computer network from a first computing device, an indication of interest in an online content item. The online content can be associated with a commercial entity having a location identified in an online content item selection data structure. The instructions include instructions to correlate the online content item with an identifier associated with an application executing on the first computing device. The instructions include instructions to receive, via the computer network from one of the first computing device and a second computing device, a plurality of data points that each comprise time information and location information of one of the first computing device and the second computing device. The instructions include instructions to generate a valid cluster indicating an activity at the location of the commercial entity. The valid cluster can be based on a comparison of a first data point of the plurality of data points with second data points of the plurality of data points, where the comparison satisfies a duration threshold and a location threshold. The instructions include instructions to identify the indication of interest in the online content item as the location based conversion.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

Like reference numbers and designations in the various drawings indicate like elements.

DETAILED DESCRIPTION

Figure 1:
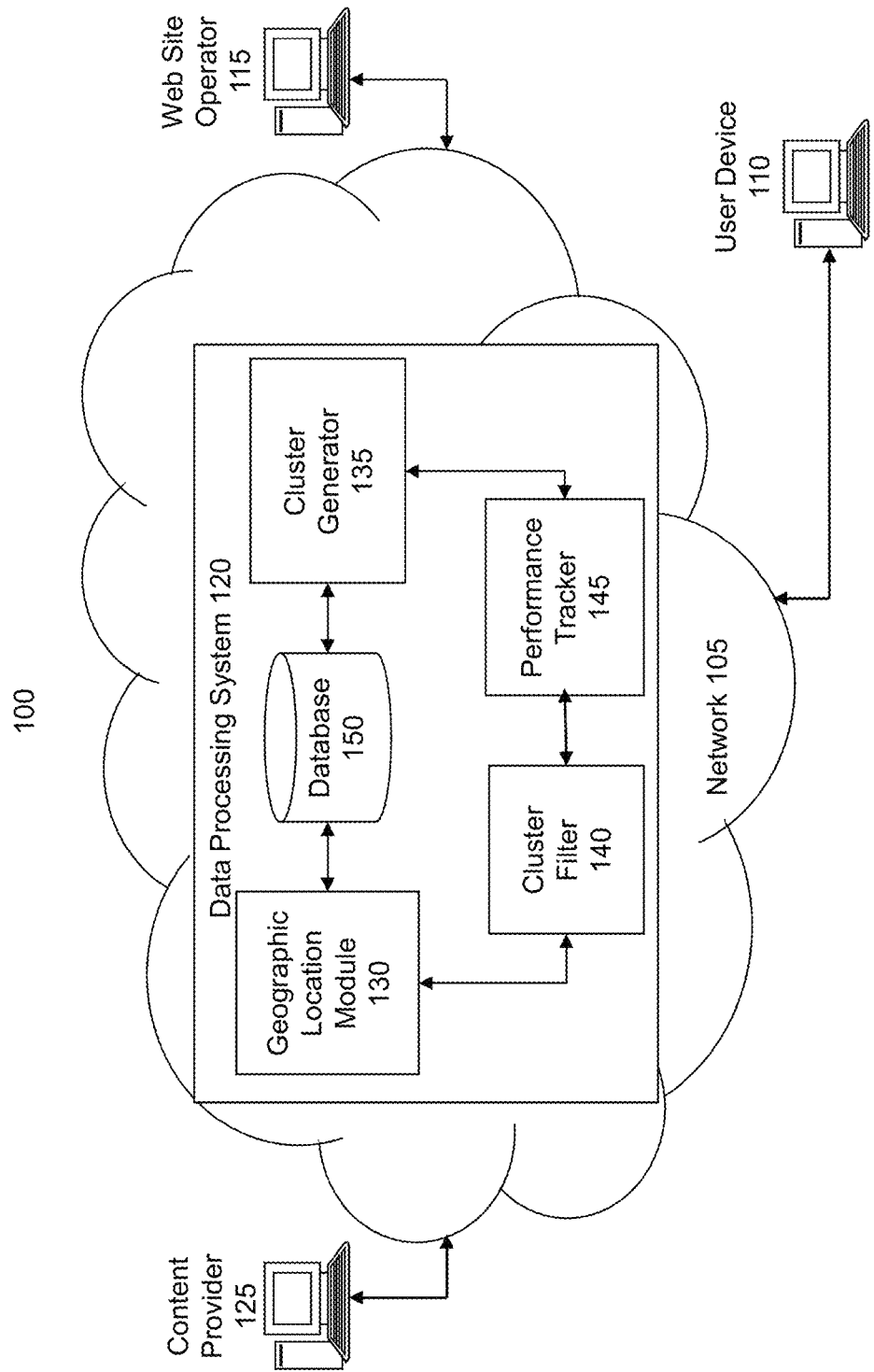
FIG. 1 is an illustration of one implementation of a system for generating a valid cluster associated with a location of a commercial entity via a computer network.

Systems and methods of the present disclosure relate generally to clustering locations of a user device into valid clusters and associating the locations of the user device with a commercial entity (such as a retail store or restaurant) to determine whether the user device was or is physically present at locations of commercial entities. False positives, such as a user in possession of the user device walking or driving past the commercial entity, can be filtered out so that they are not part of the valid cluster. The systems and methods of the present disclosure also relate generally to measuring the number of store visits that occur after a user clicks on or views an online advertisement for the store.

In some implementations, the system receives a plurality of location data points from a user's remote device. The system can group the location data points into closely bounded areas or clusters. These clusters are then filtered by proximity to relevant store locations (e.g., commercial entities associated with an online advertisement campaign). The clusters can further be filtered based on a cluster duration in order to filter out false positives such as a user device passing a store location, for example in a vehicle, or remaining at a commercial entity location for an extended period of time, for example a store employee working at a store. Thus, by clustering location data points based on location and duration thresholds, and by applying various optimization techniques to determine the location and duration thresholds, the systems and method discussed herein can identify a store visit as compared to a user walking by a store or working at a store.

In one implementation, the data processing system receives an indication from a first computing device (e.g., laptop, desktop, tablet) that a user clicked on an online content (e.g., advertisement) and correlates the click with a unique user identifier and the online content. The system can identify the commercial entity that provided the online content and further identify a location of the commercial entity. Thereafter, the system may receive a plurality of location pings or data points from a user device (e.g., mobile user device or smart phone) that is associated with the same unique identifier. The system can filter the location pings based on a proximity to the commercial entity, and further cluster the location pings to generate a valid cluster that indicates a user spent a significant amount of time at a location. The location and duration thresholds used to filter the location pings can facilitate determining whether a user drove by the commercial entity (e.g., a retail store), visited the store, or works at the store.

If the system determines that the user who clicked on the content using the first computing device later visited the store (e.g., carrying the mobile user device), the system can cross-reference the click with the store visit to identify a location based conversion.

In some implementations, the data processing system can aggregate the metrics and report the metrics upon determining that a sufficient number of users visited a store, thereby maintaining user privacy. The system can provide performance metrics including, e.g., an in-store visit rate (number of unique users visited/number of clicks eligible for location measurement); visits/clicks (number of visits/number of users clicks); estimated clicks visited (in-store visited rate*number of total clicks (eligible & ineligible); estimated visits ([vists/clicks]*number of total clicks (eligible & ineligible).

FIG. 1 illustrates one implementation of a system 100 for generating a valid cluster based on a location of a commercial entity via a computer network such as network 105, determining a geographic location based conversion. The network 105 can include computer networks such as the Internet, local, wide, metro, data, or other area networks, intranets, satellite networks, combinations thereof, and other communication networks such as voice or data mobile telephone networks. The network 105 can be used to access information resources such as web pages, web sites, domain names, or uniform resource locators that can be displayed on at least one user device 110, such as a laptop, desktop, tablet, personal digital assistant, smart phone, or portable computers. For example, via the network 105 a user of the user device 110 can access web pages provided by at least one web site operator 115. In this example, a web browser of the user device 110 can access a web server of the web site operator 115 to retrieve a web page for display on a monitor of the user device 110. The web site operator 115 generally includes an entity that operates the web page. In one implementation, the web site operator 115 includes at least one web page server that communicates with the network 105 to make the web page available to the user device 110.

The system 100 can include at least one data processing system 120. The data processing system 120 can include at least one logic device such as a computing device having a processor to communicate via the network 105, for example with the user device 110, the web site operator 115, and at least one content provider 125. The data processing system 120 can include at least one server. For example, the data processing system 120 can include a plurality of servers located in at least one data center. In one implementation, the data processing system 120 includes a content placement system having at least one server. The data processing system 120 can also include at least one geographic location module 130, at least one cluster generator module 135, at least one cluster filter 140, at least one performance tracker module 145 and at least one database 150. The geographic location module 130, cluster generator module 135, cluster filter 140 and performance tracker module 145 can each include at least one processing unit or other logic device such as programmable logic array engine, or module configured to communicate with the database 150. The geographic location module 130, cluster generator module 135, and cluster filter 140 can be separate components, a single component, or part of the data processing system 120.

In some implementations, the data processing system 120 obtains anonymous computer network activity information associated with a plurality of user devices 110. A user of a user device 110 can affirmatively authorize the data processing system 120 to obtain network activity information corresponding to the user's user device 110. For example, the data processing system 120 can prompt the user of the user device 110 for consent to obtain one or more types of network activity information, such as geographic location information. The identity of the user of the user device 110 can remain anonymous and the user device 110 may be associated with a unique identifier (e.g., a cookie).

For situations in which the systems discussed here collect personal information about users, or may make use of personal information, the users may be provided with an opportunity to control whether programs or features that may collect personal information (e.g., information about a user's social network, social actions or activities, a user's preferences, or a user's current location), or to control whether or how to receive content from the content server that may be more relevant to the user. In addition, certain data may be treated in one or more ways before it is stored or used, so that certain information about the user is removed when generating parameters (e.g., demographic parameters). For example, a user's identity may be treated so that no identifying information can be determined for the user, or a user's geographic location may be generalized where location information is obtained (such as to a city, ZIP code, or state level), so that a particular location of a user cannot be determined. Thus, the user may have control over how information is collected about the user and used by a content server.

In one implementation, the data processing system 120 receives content or content items from a content provider 125, such as a commercial entity, online retailer, business, advertiser, individual or any entity that wants to provide content for display on a user device 110 via the computer network 105. The content or content items may include, e.g., text, characters, symbols, images, video, audio, or multimedia content. For example, a content item may include an online advertisement, article, promotion, coupon, or product description. In addition to receiving content from a content provider 125, the data processing system 120 may receive location information associated with the content provider 125 that provides the content or the commercial entity associated with the provided content in the event a third-party is providing the content to the data processing system 120 on behalf of a commercial entity (e.g., an advertiser creating and providing advertisements for a retail store). The data processing system 120 can store, in database 150, the location as a location extension. Since a content provider 125 may have multiple content campaigns (e.g., advertisement campaigns that include multiple advertisements for the same or similar landing page), in one implementation, the location extension can be stored in a content selection data structure associated with the content provider 125 rather than each individual content, content campaign or content group (e.g., multiple content having similar keywords or content selection criteria). In one implementation, the location extension can be associated with a content provider's 125 unique identifier when a content provider 125 establishes or sets up a content campaign or provides content to the data processing system 120.

In one implementation, the data processing system 120 parses a table comprising content group identifiers to compute a mapping to a commercial entity identifier. In one implementation, the data processing system 120 may filter the content group identifiers based on whether the content provider 125 opted in for the systems and methods disclosed herein. The data processing system 120 then queries a content selection data structure extension table with the commercial entity ID to obtain the location extension which contains, e.g., latitude and longitude pairs for the commercial entity's store locations. In one implementation, the data processing system can employ distributed computing on clusters of computers using libraries or programming for processing large data sets (e.g., MapReduce or Apache Hadoop).

The data processing system 120 may provide the content item to the web page for display in response to receiving a request for content from a computing device such as, e.g., user device 110. In some implementations, the data processing system 120 receives the request via an application executing on the user device 110. For example, a mobile application executing on a mobile device (e.g., smart phone or tablet) may make a request for content. In another example, a web page may request content from the data processing system 120 responsive to a user of a mobile device 110 visiting the web page (e.g., via a mobile device 110).

In some implementations, the request for content includes information that can facilitate content selection. In some implementations, the data processing system 120 may request information from the user device 110 to facilitate identifying content or selecting content. The data processing system 120 may request or obtain information responsive to receiving a request for content from the user device 110. The information may include information about displaying the content on the user device 110 (e.g., a content slot size or position) or available resources of user device 110 to display or otherwise manipulate the content.

Responsive to a request for content from a web page operator 115, the data processing system 120 provides a content item for display with a web page on a user device 110. A user of the user device 110 may view the content item (e.g., an impression) or may click on or select the content item (e.g., a click). In one implementation, an indication of user interest in the content item may include a click, selection, mouse over, finger gesture, shake motion, voice command, tap, or another indication that indicates user interest in the content item.

In one implementation, the data processing system 120 includes a performance tracker module 145 that receives the indication of user interest in the content item via the computer network 105. The data processing system 120 can correlate the indication of user interest with the online content item. In one implementation, the data processing system 120 obtains an identifier (e.g., a username or cookie) associated with an application executing on the user device 110 (e.g., a web browsing session executing on a desktop computer, laptop computer, tablet computer, or smart phone). The identifier may include or correspond to a username used to access an application or online account (e.g., an email log in, maps program login, online social network login, or any other identifier). In one implementation, the data processing system 120 can log or store, in a content selection data structure, information associated with the content item, commercial entity, and an identifier associated with the interest in the content item.

The data processing system 120 can receive the indication of user interest from the user device 110 via the network 105, responsive to receiving the indication of interest, transmit a request to the user device 110 for an identifier of the user device 110. For example, the user device 110 can transmit, to the data processing system 120, the identifier upon receiving the request for the identifier. In one implementation, a user of the user device 110 may receive a prompt or other notification of the request for the identifier. The data processing system 120 may receive the identifier upon a user of the user device 110 opting-in or agreeing to provide the identifier.

In one implementation, the content selection data structure for commercial entity location may include:

Content Click -* Content_Group_Creative_Id -* CustomerId -* Store locations {<lat,long> ... }.

The "Content Click" may refer to the data processing system 120 receiving, from a user device 110 via the computer network, an indication of interest in a content item displayed with a web page (e.g., a user clicking or selecting an advertisement or creative on a web page). The content item may be associated with a content group (e.g., the advertisement can be associated with a Content_Group_Creative_ID that identifies the creative or the content group with which it is associated; the content group identifier can be further mapped to a customer ID that identifies the content provider or commercial entity). The data processing system 120 can store the user interaction information in a content selection data structure as indicated above, for example.

In one implementation, the data processing system 120 includes a geographic location module 130 designed and constructed to receive data points from a user device 110. The data processing system can receive the data points via a computer network 105 via a TCP/IP protocol, cell phone data network, or another communication protocol of computer network 105. The data points can include location information and time information, or the data processing system 120 can determine the location or time information associated with a received data point upon receiving the data point from the user device 110. The data processing system 120 can also receive an identifier associated with the data point, such as a unique user identifier, or a username associated with an application executing on the user device 110. In one implementation, an application executing on the user device 110 (e.g., a mobile application, a mobile operating system, a web browser, a map application, etc.) can transmit the data point that includes the location information. In one implementation, a mobile user device 110 may periodically ping the data processing system 120 or other intermediate system to provide location or time information. In one implementation, a smart phone or other cellular enabled user device 110 can ping a cell phone tower system, which may then provide location or time information to the data processing system 120.

In one implementation, the data processing system 120 receives data points or pings in real time on a predetermined time interval such as a periodic basis (e.g., 10 minutes, 5 minutes, 1 minute, 30 seconds, or another period that can facilitate the systems and methods disclosed herein). The data processing system 120 can receive the data points in a batch processes that runs periodically where multiple data points associated with a user device or multiple user devices can be provided to the data processing system 120 in a single upload process. In one implementation, the user device 110 pushes the data points to the data processing system 120 in real-time, periodic basis, or in a batch process. In one implementation, the user device 110 that clicked on the content item is different than the user device 110 that provides the data points (e.g., a user may use a desktop or laptop computer to click on the content item, and use a mobile device or smart phone to provide data points). In another implementation, the user device 110 used to click on the content item is the same as the user device 110 used to the data points.

The data points may include, or the data processing system 120 may determine, geographic location information of the data point based on, e.g., GPS, Wi-Fi, Bluetooth or cell tower triangulation techniques. In some implementations, the data processing system 120 may determine a latitude and longitude coordinate and identify a larger geographic area or tile comprising the latitude and longitude coordinate. The geographic location may correspond to a latitude or longitude coordinate, or the geographic location may correspond to a larger or smaller area, for example.

In some implementations, the received data points may include, or the data processing 120 may determine, geographic location information including, e.g., latitude and longitude coordinates, geographic information system ("GIS") information, country, state, city, county, town, or precinct. The data processing system 120 may receive or otherwise identify geographic location information associated with the user device 110 via an application programming interface ("API") that can provide scripted access to geographic location information associated with the user device 110. For example, the geographic API specification may include a specification associated with the World Wide Web Consortium ("W3C"). In one implementation, a user of a user device 110 proactively declares a location by checking-in to a location or otherwise declaring to an application executing on the user device 110 or to the data processing system that the user is at a location.

In some implementations, the geographic location of the user device 110 can be determined via at least one of a global positioning system ("GPS"), cell tower triangulation, or Wi-Fi hotspots. The data processing system 120 can also determine geographic location information based on a user's interaction with an information resource. For example, the user device 110 may include a global positioning system ("GPS") or the data processing system 120 may determine a geographic location based on an internet protocol ("IP") address. For example, the user device 110 may include a GPS sensor or antenna and be configured to determine a GPS location of the user device 110. The data processing system 120 can also determine the geographic location by using information obtained from one or more cell towers to triangulate the location of the user device 110. For example, the geographic location determined based on one information received from one cell tower, two cell towers or three cell towers may be sufficient for content selection. In some implementations, Wi-Fi hotpots may facilitate determining a geographic location because Wi-Fi hotspots may be stationary and can be used as a landmark. For example, the relation of a user device 110 with respect to a Wi-Fi hotspot can facilitate determining a geographic location of the user device 110.

In some implementations, the geographic location of the user device 110 can be determined via a pair of Bluetooth enabled devices. In one implementation, a first Bluetooth enabled device may broadcast to a second Bluetooth enabled device. The data processing system 120 may already have location information for the first Bluetooth enabled device, or the first Bluetooth enabled device may provide the location information. Upon receiving, by the first Bluetooth device, an indication from the second Bluetooth device that the second Bluetooth device is within range, one of the first Bluetooth enabled or second Bluetooth enabled device may further indicate to the data processing system 120 that the second Bluetooth device is within a certain range of the first Bluetooth enabled device. Based on the indication of being within range of the first Bluetooth enabled device, the data processing system 120 can determine a location for the second Bluetooth enabled device.

In one implementation, a commercial entity or content provider 125 can push, or otherwise provide, to the user device 110, a geo-fence that includes the location of the commercial entity. When the user device 110 enters the geo-fence, the user device 110 can start pinging or providing data points to the data processing system 120.

The data processing system 120 can receive or determine a relatively more precise geographic location (e.g., a latitude and longitude coordinate) in order to identify a larger geographic area that includes the latitude coordinate and longitude coordinate. For example, the larger area may include a geographic tile that includes the relatively more precise geographic location. In another example, the geographic area may include a map tile that includes the latitude and longitude coordinate. In some examples, the data processing system 120 may receive or obtain the larger, less precise geographic area from the user device 110. For example, a mobile application of a smartphone may provide to the data processing system 120 a geographic area or map tile. The geographic area may be any shape or resemble any region that includes a geographic location of the user device 110 and generating valid location clusters.

In one implementation, the data processing system 120 includes a cluster generator module 135 designed and constructed to generate one or more location clusters. The cluster generator module 135 can use one or more techniques to generate clusters. In one implementation, the data processing system 120 filters out data points based on a proximity to a location of a commercial entity, or a commercial entity for which a click or other indication of user interest (e.g., indicated as a Content Click in the content selection data structure described above) was received within a predetermined time interval (e.g., 12 hours, 24 hours, 72 hours, 7 days, 1 month) of the data point. In one implementation, the data processing system 120 may apply a coarse filter prior to generating a cluster to determine whether the location associated with a data points is generally in the vicinity of a commercial entity for which the data processing system 120 contains location information in the content selection data structure (e.g., 400 meters, 800 meters, 1 kilometer, 5 kilometers, 10 kilometers). This coarse filtering of data points may filter out numerous data points prior to clustering the data points to generate a location cluster and identify a valid cluster. In another implementation, the data processing system 120 does not apply this filter and may perform a filter based on the location of a commercial entity after generating the location clusters.

The location clusters include a first data point, such as an initial data point and subsequent data points. The first data point may refer to a centroid data point which the data processing system 120 can use to identify which of the subsequent data points satisfy a distance threshold in order to generate a location cluster. While referred to as subsequent data points, the subsequent data points may, but need not be received by the data processing system 120 later in time relative to the first data point. The data processing system 120 can identify the first data point based on a time factor, location factor, or other logic. In one implementation, the data processing system 120 identifies the first data point as the earliest received data point that satisfies the coarse filtering; e.g., the first data point with a location within 400 meters of the location of a commercial entity that is stored in the content selection data structure. In another implementation, the data processing system 120 may identify the first data point based on identifying a plurality of data points that were received within a predetermined time interval (e.g., all data points received in the span of 30 minutes) and then identifying a centroid data point of the plurality of data points (e.g., by mapping the data points and identifying the data point closest to the center).

In one implementation, where the first data point is the first data point based on time, subsequent data points refer to data points that were received (or contain a timestamp) that is after the first data point. The subsequent data points can refer to one or more data points with time stamps immediately after the first data point.

Upon identifying a first data point, the data processing system 120 can generate a cluster with the subsequent data points by determining whether each subsequent data point satisfies a distance threshold. In one implementation, the data processing system 120 identifies the first data point and then compares the location of the first data point with a location of the second data point. If the second data point is within the distance threshold of the first data point, the data processing system 120 generates a location cluster that includes the first data point and the second data point. In one implementation, the data processing system 120 can identify a third data point, that is subsequent to the second data point, and compare the third data point with the first data point. In this example, the data processing system 120 compares the distance of each subsequent data point with the first data point. If the distance between the first data point and the third data point satisfies the threshold distance, then the data processing system 120 can generate a cluster with, or add to the cluster being generated, the third data point. If the third data point does not satisfy the threshold distance (e.g., exceeds the threshold distance), then the data processing system 120 may not include the data point in the location cluster.

In one implementation, the data processing system 120 may identify the third point as a new initial or new first data point of a second location cluster, and proceed to process data points subsequent to the third data point in a manner similar to above.

In one implementation, the system 120 can include a plurality of distance thresholds (e.g., first, second, third, fourth distance thresholds) that correspond to different distances (e.g., 10 meters, 20 meters, 30 meters, 50 meters, etc.). Using the various distance thresholds, the system can generate a plurality of location clusters of different sizes. This may facilitate generating valid clusters in different environments, such as rural and urban environments, or in relation to different size commercial entities, such as department stores, stadiums, convention centers, or boutiques.

The threshold distance can be static or dynamic. In one implementation, the threshold distance can be a static value (e.g., 50 meters, 100 meters, 200 meters, etc.). In another implementation, the threshold distance can be fine tuned based on feedback or optimization techniques. For example, the data processing system 120 may determine that cluster sizes are too large because they are not indicative of a user visiting a store, and thus lower the threshold distance value. In another implementation, the data processing system 120 may determine that the threshold distance is too small in relation to the size of a commercial entity because too many clusters were generated for a commercial entity.

In one implementation, the data processing system 120 can vary the threshold distance based on the granularity of the location information available. For example, WiFi, cell triangulation and GPS provide location information with varying accuracy or resolution. The data point may include information as to the locating technique being used, or the data processing system 120 may determine the location technique being used based on the type of data included in the data point. If the location information is accurate to within 100 meters, then the threshold distance may be 100 meters. If the location information is accurate to within 50 meters, then the threshold distance may be 50 meters.

In one implementation, the data processing system 120 can set a minimum or maximum number of data points for a cluster. The minimum and maximum values may be static or dynamic (e.g., predetermined numbers or numbers that vary based on optimization processes; numbers that vary based on geographic locations (e.g., urban areas versus rural areas), etc.). In one implementation, the data processing system 120 does not identify cluster as a location cluster unless the location cluster includes a minimum number of data points (e.g., 3, 4, 5 or another value that facilitates generating valid clusters). The data processing system 120 can also set a maximum number of data points for a cluster before generating a second cluster. The maximum number may be set based on an static value (e.g., 3, 4, 5, 10, 20, or another value that facilitates generating valid clusters), or dynamic (e.g., based on the geographic location).

In one implementation, clusters can be defined inductively as: Ci, bucket←$l_j$, and for all k>=1: Ci, bucket←$l_{j+k}$ if $l_{j+k-1}$ $^{in}$ Ci, bucket and distance(lj, lj+k)<=bucket.size.

In this implementation, Cj, bucket is the $j^{th}$ cluster, indexed by distance buckets (e.g., threshold distance). In one implementation, the data processing system 120 can use multiple bucket sizes to generate different sized location clusters. Bucket sizes can include one or more of 10 meters, 50 meters, 100 meters, and 200 meters.

In one implementation, the following pseudo-code describes the clustering function performed by the data processing system 120 (e.g., by the cluster generator module 135):

```
BuildClusters(bucket : int, bucketSize : int, locationData : array of int)
    i : int - 0
    j : int - 0
    k : int - 0
    clusters[bucket][i] - {}
    while j+k < Len(locationData) :
        if Distance(locationData[j], locationData[j+k]) > bucketSize :
            i - i+1
            j - j+k
            k - 0
            clusters[bucket][i] - {}
        Insert(locationData[j+k], clusters[bucket][i]
        k - k+1
    return clusters[bucket]
```

In one implementation, for each bucket (e.g., distance threshold), the computed clusters are given a point representation using the centroid of all points in that cluster. A time duration (time spent in the cluster determined from time information associated with data points of the cluster) can be associated with each such user location cluster point.

The data processing system 120 can include a cluster filter 140 designed and constructed to filter clusters (e.g., location clusters or a set of valid clusters). For example, the data processing system 120 can filter location clusters by their proximity to the location of a commercial entity. In one implementation, the data processing system 120 filters location clusters by their proximity to the location of a commercial entity associated with clicks that occurred prior to the last location data point in a cluster (e.g., as indicated in the content selection data structure described above or another data structure that stores network activity associated with a user viewing a content item on a web page).

The following pseudo code, for example, may be used to filter clusters based on the proximity to a location of a commercial entity associated with a content item that was recently clicked on by a user of the user device 110:

for all i: for all store locations S for ad clicks before endTime(Ci, bucket):
   if distance(Ci, $_{bucket}$, S) > bucket.size then:
      discard(Ci, bucket)

The data processing system 120 (e.g., via the cluster generator module 135) can use one or more clustering techniques together, in combination, use one or more aspects of each technique, use both techniques in series or parallel processing, or otherwise employ aspects of one or more clustering techniques to facilitate generating a valid cluster. In one implementation, the data processing system 120 can generate clusters using a technique that includes identifying or generating pairs of data points to determine clusters based on a distance threshold, a duration threshold, a minimum cluster duration threshold and a maximum cluster duration threshold.

In one implementation, the data processing system 120 obtains data points associated with a user identifier. The data points can be sorted, ordered or ranked based on time. Using the time information of the data point, the data processing system 120 can create data point pairs that include adjacent data points based on time (e.g., adjacent data points on a time axis). The data processing system 120 can further determine a distance between the two data points in a data point pair. Based on the distance between the two data points in a data point pair, the data processing system 120 can sort, order, rank or otherwise indicate a relative distance as compared to the data point pairs. In one implementation, the data point pairs can be sorted in ascending order of distance between the data points in the pair.

Using the data point pairs sorted based on distance, the data processing system 120 identifies a first data point pair to define a first cluster (e.g., the first data point pair may include the two points that are closest to each other in distance). The first data point pair may be an unvisited pair in that the data processing system 120 may not have already analyzed an aspect associated with the data point pair. Using the identified first data point pair, the data processing system 120 can define a cluster C that includes a start and an end (e.g., C<start, end>), where start indicates a characteristic of a first data point of the first data point pair (e.g., the time information of the first data point) and end indicates a characteristic of a second data point of the first data point pair (e.g., the time information of the second data point).

The data processing system 120 can then identify an immediately preceding data point ("P") of the obtained data points associated with the user identifier that immediately precedes the start of the cluster based on time. The data processing system 120 can also identify an immediately succeeding data point ("P'") of the obtained data points associated with the user identifier that immediately succeeds the end of the cluster based on time.

Using the time and distance information associated with the immediately preceding data point P and the immediately succeeding data point P', as well as the start and end information of the cluster C<start, end>, the data processing system 120 can determine a time between P and the start of the cluster ("PT"), a time between P' and the end of the cluster ("P'T"), a distance between P and the current centroid of the cluster ("PD"), and a distance between P' and the current centroid of the cluster ("P'D"). The data processing system 120 can determine the centroid by identifying the geometric center of the region comprising the data points of the cluster (e.g., in a two-dimensional shape, the centroid may be the arithmetic mean position of the data points in the shape, or in an n-dimensional space, the centroid may include the mean position of the data points of the coordinate directions. In some implementations, the centroid may include the geographical center, or a radial projection of a region of the Earth's surface to sea level.

Upon determining the PT, P'T, PD, and P'D, the data processing system 120 can determine whether to add one or more of the data points to the cluster C using a duration threshold (e.g., a maximum duration threshold such as 1 min, 2 min, 3 min, 5 min, 7 min, 10 min, 20 min, 30 min or any other maximum duration threshold that facilitates cluster generation) and a distance threshold (e.g., a distance threshold such as 10 m, 15 m, 20 m, 25 m, 50 m, 100 m, 200 m or any other distance threshold that facilities generating a cluster). In one implementation, the data processing system 120 determines if PT and P'T are less than a duration threshold, and if PD and P'D are less than the distance threshold. If so, and if PD is smaller than P'D, then cluster C<start, end> will be adjusted to include P so it becomes cluster C<P, end>. However, if PT and P'T are less than the maximum duration threshold and PD and P'D are less than the distance threshold, but PD is not smaller than P'D, then the cluster is adjusted to include P' so that cluster C<start, end> becomes cluster C<start, P'>. The data processing system 120 can then identify a new immediately succeeding data point $P_{new}$' or a new immediately preceding data point $P_{new}$ of the obtained data points associated with the user identifier to determine whether to add one or more of the new data points to the cluster.

If the data processing system 120 determines that PT is less than the duration threshold and PD is less than the distance threshold, then the data processing system 120 adjusts cluster C to include the immediately preceding point so cluster C<start, end> becomes C<P, end>. The data processing system 120 can then identify a new immediately succeeding data point $P_{new}$' or a new immediately preceding data point $P_{new}$ of the obtained data points associated with the user identifier to determine whether to add one or more of the new data points to the cluster.

If the data processing system 120 determines that P'T is less than the duration threshold and P'D is less than the distance threshold, then the data processing system 120 can adjust the cluster to include the immediately succeeding data point such that cluster C<start, end> becomes C<start,P'>. The data processing system 120 can then identify a new immediately succeeding data point $P_{new}$' or a new immediately preceding data point $P_{new}$ of the obtained data points associated with the user identifier to determine whether to add one or more of the new data points to the cluster.

In one implementation, the following pseudo code describes one aspect of the clustering function performed by the data processing system 120 (e.g., by the cluster generator module 135):

if PT and P'T are less than the duration threshold and PD and P'D are
   less than the distance threshold
      if PD is smaller than P'D
            then C<Start, End> becomes C<P, End>;
      else
            C<Start, End> becomes C<Start, P'>;
   go to identify new preceding or succeeding data points;
if PT is less than the duration threshold and PD is less than the distance
threshold,
   then C<Start, End> becomes C<P, End>;
   go to identify new preceding or succeeding data points;
if P'T is less than the duration threshold and P'D is less than the distance
threshold,
   then C<Start, End> becomes C<Start, P'>;
   go to identify new preceding or succeeding data points;

-continued

```
if the above conditions are not true
    then output C<Start, End> as a cluster;
    go to identifying an unvisited data point pair to define a new
    cluster C'<Start,
        End>;
```

If the data processing system 120 does not identify a data point to add to cluster C, then the data processing system 120 can identify a new data point pair that has not been analyzed yet (e.g., unvisited data point pair) to generate a second cluster C'<start, end>. The data processing system 120 can proceed to identify immediately preceding and immediately succeeding data points for the second cluster to determine if one or more data points should be added to the second cluster in the manner described above.

Upon analyzing the data point pairs or identifying that the data point pairs have been visited, the data processing system 120 can filter the clusters based on a minimum cluster duration threshold or a maximum cluster duration threshold to identify a set of valid clusters. In one implementation, the data processing system 120 can remove clusters that include a time duration (e.g., based on the adjusted start and end times of the cluster C) that is less than the minimum cluster duration threshold (e.g., 1 min, 2 min, 3 min, 5 min, 7 min, 10 min, 20 min, 30 min or any other minimum cluster duration threshold that facilitates cluster generation). The data processing system 120 can also remove clusters that include a time duration (e.g., based on the adjusted start and end times of the cluster C) that is greater than the maximum cluster duration threshold (e.g., 1 min, 2 min, 3 min, 5 min, 7 min, 10 min, 20 min, 30 min or any other maximum cluster duration threshold that facilitates cluster generation). The remaining clusters that may comprise the set of valid clusters.

The data processing system 120 can determine if one or more clusters in the set of valid clusters is within a distance threshold to a commercial entity to determine a valid cluster of the set of valid clusters that indicates an activity at the commercial entity.

In one implementation, the data processing system 120 includes a performance tracker module 145 designed and constructed to correlate a visit to a commercial entity with an indication of user interest in an online content item to determine a location based conversion. In one implementation, the data processing system 120 determines an identifier of a valid cluster associated with the commercial entity and further determines the identifier associated with a click or other indication of user interest. The data processing system 120 can map the click or other indication of user interest to the valid cluster at the commercial entity to identify the location based conversion. In one implementation, the data processing system 120 can identify a timestamp of the click or other indication of user interest. The data processing system 120 can also identify a timestamp of the valid cluster, and further determine a location based conversion activity if the timestamp of the valid cluster is within a time window of the click (e.g., 4 hours, 8 hours, 12 hours, 24 hours, 48 hours, a week, a month, or another time that facilitates determining location based conversion metrics).

Figure 6:
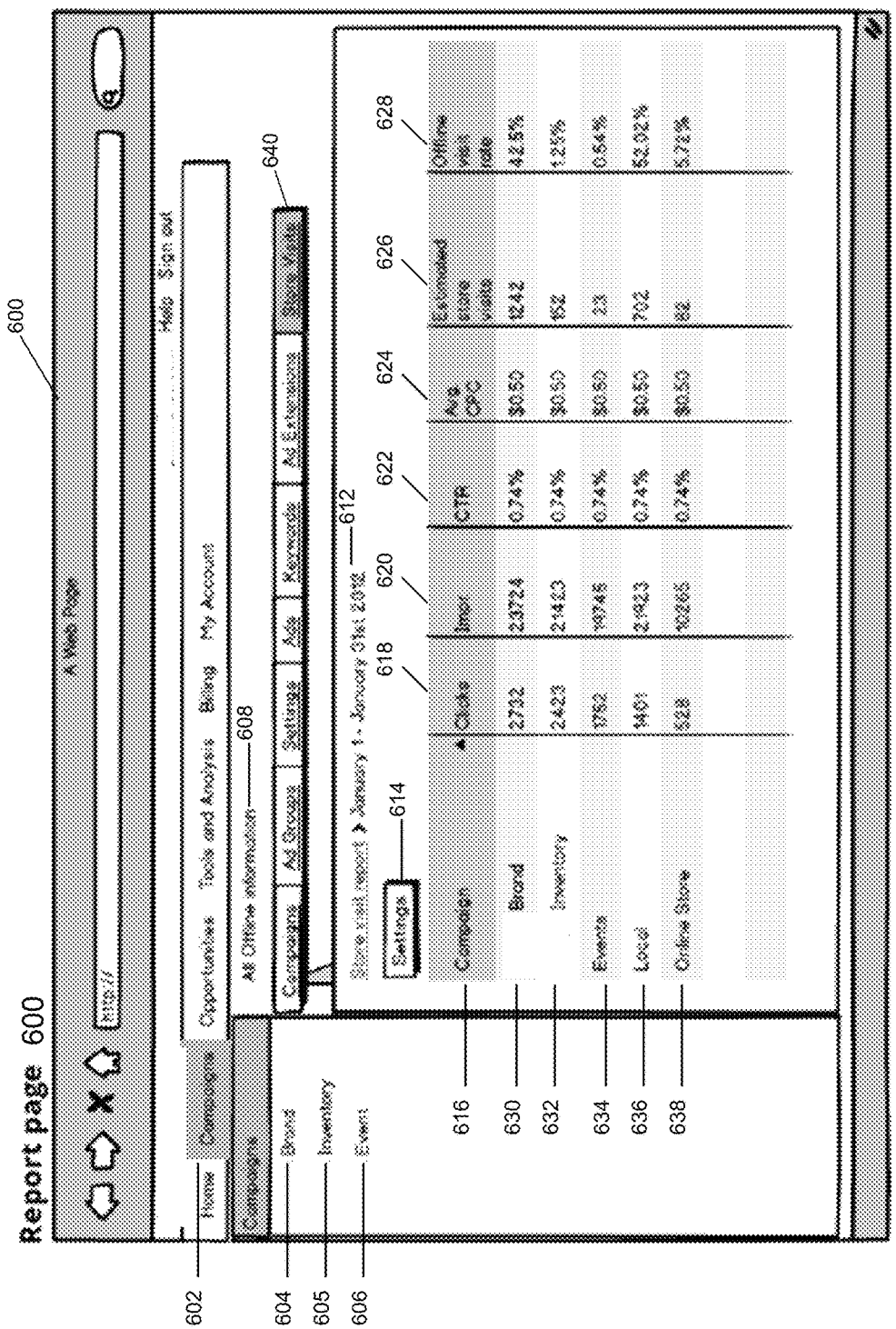
FIG. 6 is an illustration of an implementation of a graphical user interface of a report.
Figure 7:
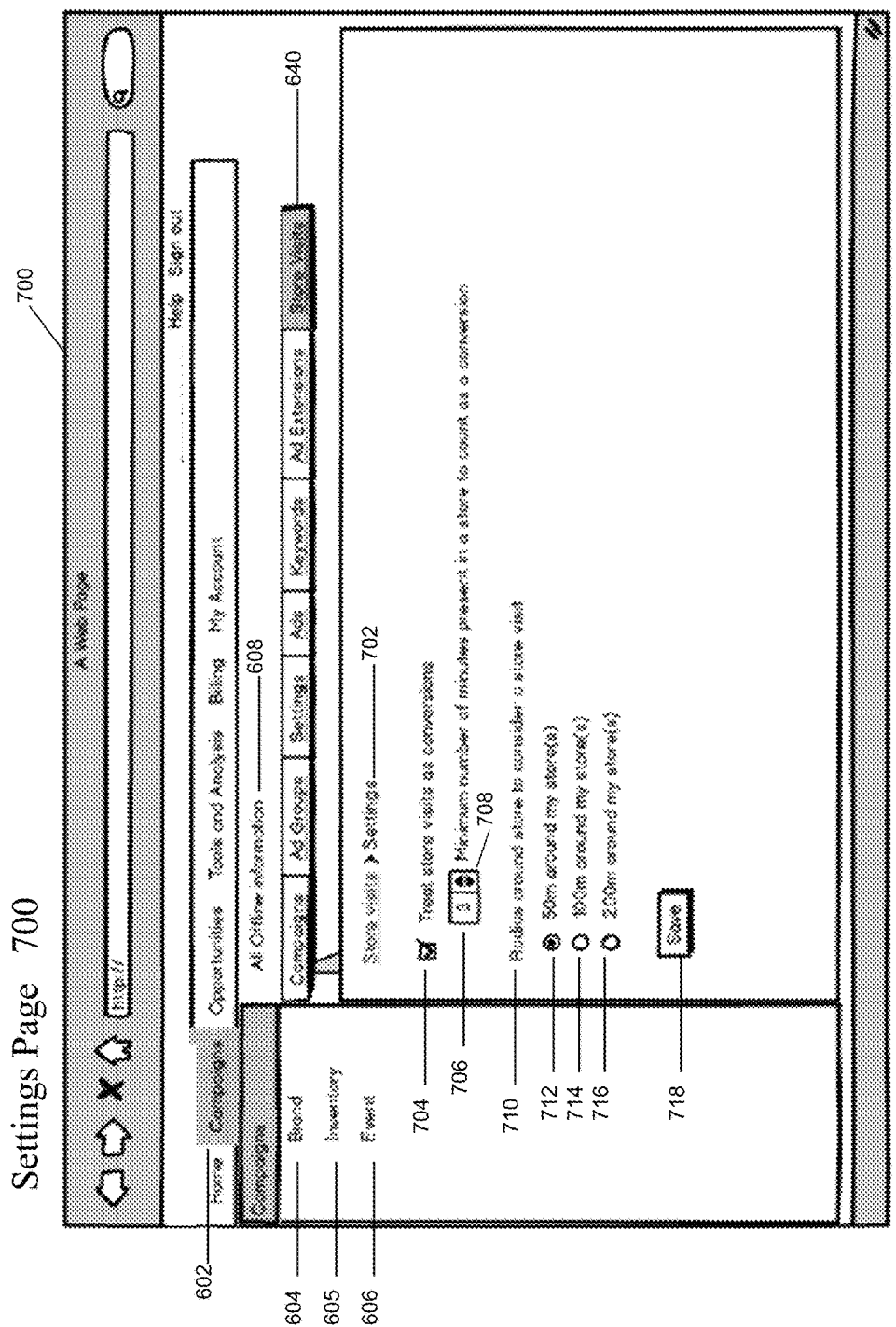
FIG. 7 is an illustration of an implementation of a graphical user interface of settings for generating a report.

In some implementations, the performance tracker module 145 can generate reports that include performance metrics based on based on location based conversions. For example, the performance tracker module 145 can generate a report that includes click-time versus visit-time. The performance tracker module 145 can also generate a report that includes one-per-click visits versus many-per click visits. In some implementations, the performance tracker module 145 can generate reports that do not include any identifier. Instead, for example, the reports can include aggregated performance metrics, such as an indication of the total number of location based conversions or other performance metric. The performance tracker module 145 can also generate a report when a number of location based conversions exceeds a minimum number, thereby eliminating the chances of personally identifying a specific user. For example, the performance tracker module 145 may generate a report if 1000 unique users (or, for example, another significantly high threshold such as 500; 2000; 5000, etc.) visited a location of a commercial entity. Illustrations of implementations of generating a report and a generated report are shown in FIGS. 6 and 7.

In some implementations, the performance tracker module 145 can remove spammy (e.g., insincere or fraudulent) clicks. For example, the data processing system 120 may determine clicks to be spammy if the data processing system 120 receives a number of clicks from the same unique identifier within a certain time interval, or from a unique identifier that is associated with a known malicious user. The data processing system 120 may include a list of unique identifier associated with malicious or fraudulent clicking or other spam-like online activity, and, therefore, eliminate indications of user interest associated with malicious unique identifiers.

Figure 2:
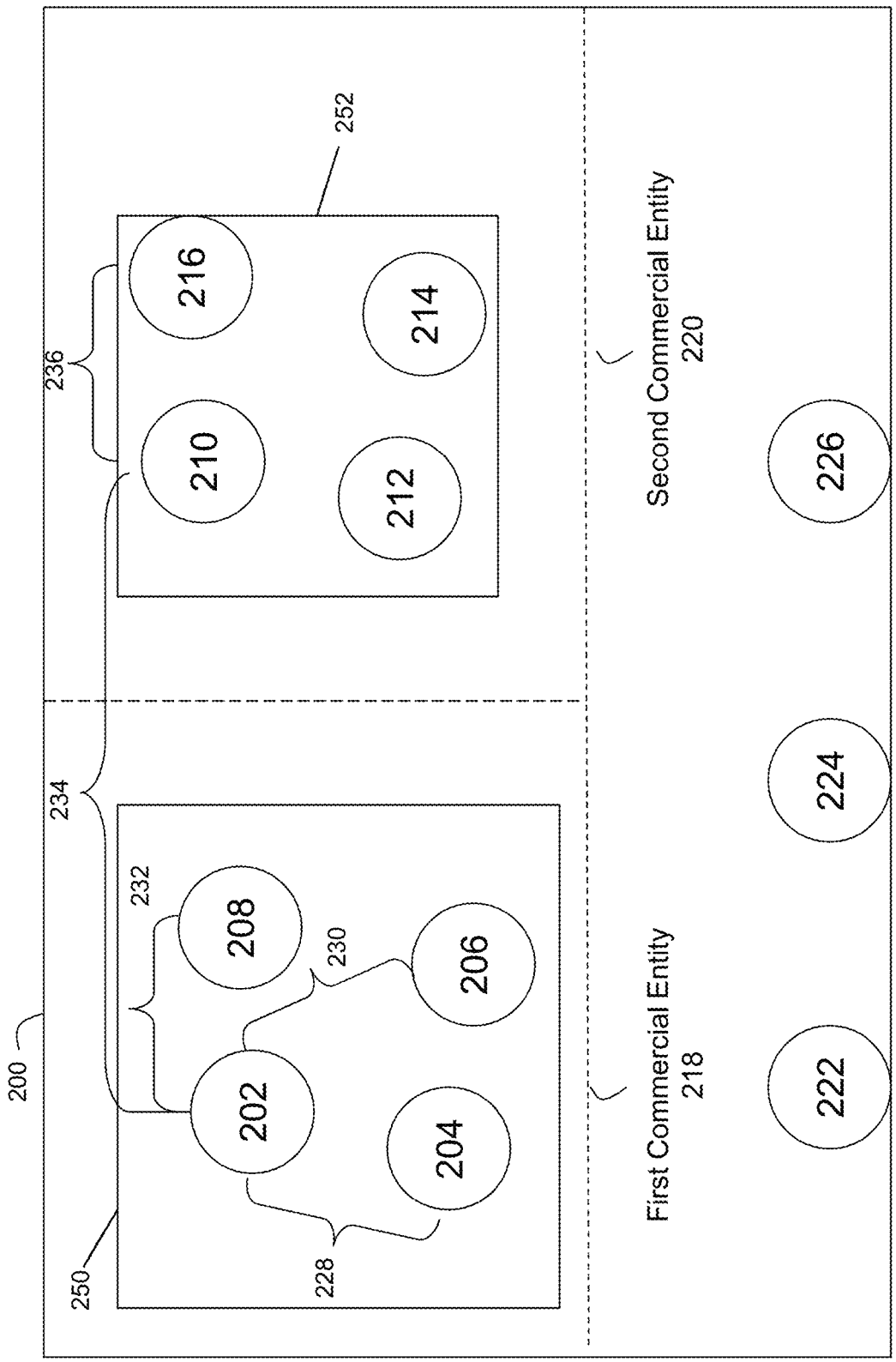
FIG. 2 is an illustration of one implementation of clusters.

FIG. 2 illustrates one implementation of generating location clusters. In brief overview, map 200 includes a first commercial 218 entity and a second commercial entity 220 that each correspond to a location of the first and second commercial entities (e.g., stores). The map 200 includes a plurality of data points 202-216 and 220-224 that correspond to location information of each data point. Distance lines 228, 230, 232, 234 and 236 indicate the distance between various data points. The system 120 can generate clusters 250 and 252 based on data points 202-216.

In further detail, the data processing system 120 can receive (in real time, periodic basis, or batch process) a plurality of data points 202-216 and 220-224 associated with a unique identifier associated with a single user device 110 (e.g., a unique identifier associated with an application executing on a user device 110, such as a mobile application that includes a username login). The first data point 202 can be received first in time. The second data point 204, which is subsequent to the first data point 202, can be received next in time. The data processing system 120 can determine a distance 228 between the first data point 202 and the second data point 204 and further compare the distance with a distance threshold. If the distance is within a distance threshold, then the data processing system 120 can generate a cluster 250, or initiate the generation of cluster 250, including the second data point 204. Similarly, system can analyze subsequent data points 206 and 208 and the corresponding distance lines 230 and 232 to include them in cluster 250.

Upon receiving data point 210, the system may determine that the distance 234 between data point 210 and data point 202 exceeds the distance threshold. The system 120, therefore, may not include data point 210 in cluster 250, and, instead, identify data point 210 as a first data point of a potential new cluster 252. Thereafter, the data processing system 120 may receive data points 212-216, compare the distance between each of data points 212-216 and the new first data point 210 with a threshold distance, and generate cluster 252.

The data processing system 120 may further determine that clusters 250 and 252 are valid clusters based on a time duration of the cluster satisfying a duration threshold, and further correlate clusters 250 and 252 with the first commercial entity 218 and second commercial entity 220. In one implementation, the data processing system 120 may identifies these two clusters as part of a set of valid clusters. The system may further filter the set of valid clusters to identify a valid cluster that is proximate to a specific commercial entity, such as first commercial entity 218, in order to determine a metric associated with the first commercial entity. For example, in generating a report for a first commercial entity, the data processing system 120 may filter the set of valid clusters to identify visits to the first commercial entity.

In one implementation, the data processing system 120, e.g., via the cluster filter 140, filters clusters based on a cluster duration for each cluster. The data processing system 120 can identify the cluster duration based on the time information associated with the data points of the cluster (e.g., the difference between a time stamp associated with the first data point of the cluster and a time stamp associated with the last data point of the cluster). Upon identifying a cluster duration, the data processing system 120 can determine whether a cluster duration satisfies a threshold time or a plurality of threshold times (e.g., 10 minutes, 5 minutes, 15 minutes, 20 minutes, or another threshold time that facilitates generating valid clusters). The threshold time can be a predetermined threshold time, or a static predetermined time that does not change for example. The data processing system 120 can compare a cluster duration with the threshold time to determine whether a cluster duration is below, meets, or exceeds the cluster duration. In one implementation, if the threshold time includes a minimum threshold time, then the data processing system 120 determines that a cluster duration satisfies a threshold time if the cluster duration meets or exceeds the minimum threshold time. If the threshold time includes a maximum threshold time, then the data processing system 120 can determine that a cluster duration satisfies a threshold time when the cluster duration is less than or equal to the maximum threshold time. The threshold time may include a bounded threshold time, such as a minimum and maximum threshold times.

Figure 3:
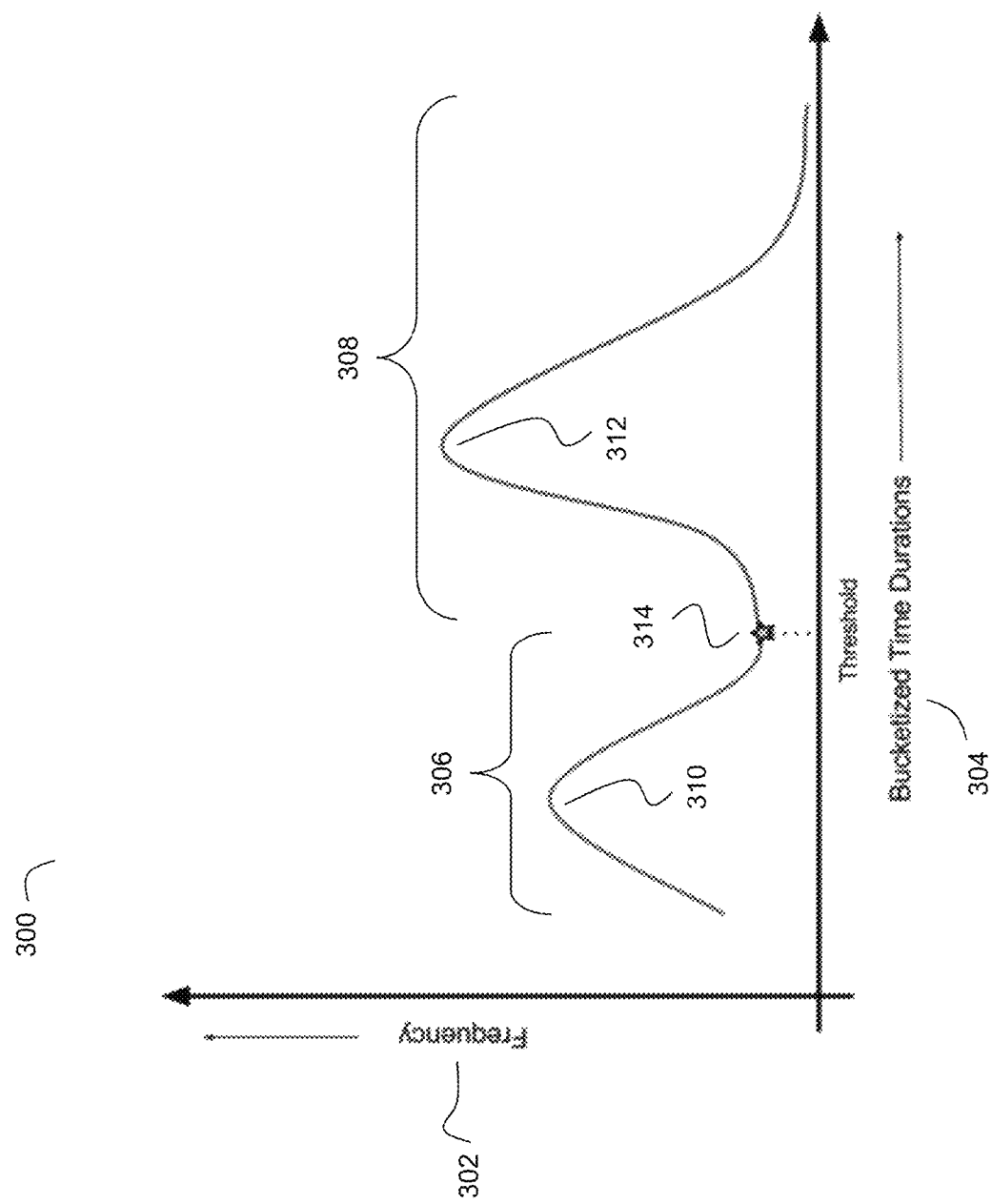
FIG. 3 is an illustration of one implementation of generating a duration threshold using a histogram analysis

The threshold time can be a dynamic value that the data processing system can optimize. For example, the data processing system 120 can optimize the threshold time using a histogram analysis. FIG. 3 shows an illustration of an implementation of using a histogram analysis technique 300 to determine a threshold time. In one implementation, the data processing system 120 can categorize clusters based on time duration into one minute intervals (e.g., one minute buckets). The data processing system 120 can also determine the frequency of each bucket (e.g., the number of clusters in a bucket that corresponds to a certain time duration). For example, the data processing system 120 can determine that there are five clusters with a duration of 5 minutes, seven clusters with a duration of 10 minutes, fifty buckets with a duration of 1 hour, and so on, to generate a histogram.

As shown in FIG. 3, the histogram can include a frequency axis 302 and a bucketized time durations axis 304. In one implementation, the graph can include two portions: a first portion 306 and a second portion 308. The first and second portions 306 and 308 can each include a maximum frequency 310 and 312. In one implementation, the first portion 306 may correspond to clusters with shorter durations, such as users walking through a commercial entity, driving by a commercial entity, walking through a shopping mall, etc. The second portion 308 may correspond to users actually visiting the location of a commercial entity (e.g., visiting a retail store to purchase an item). By identifying the first portion 306 and second portion 308, and further identifying the intersection point between the two portions, the data processing system 120 can determine a threshold time 314 to be a point between a peak 306 of the first portion 306 and a peak 312 of the second portion 308. In one implementation, the data processing system 120 can determine the threshold time 314 to be the frequency minima threshold which marks the threshold past which a user is spending significant time at or around a commercial entity. The data processing system 120 can continuously, periodically or responsive to an event trigger, reevaluate the threshold time using a histogram analysis or other technique.

In various implementations, the data processing system 120 can filter clusters based on location and a time duration to generate a set of valid clusters. The data processing system 120 can filter clusters based on location first (e.g., proximity of a cluster's centroid data point to the location of a commercial entity, or the data processing system 120 can filter clusters based on a duration threshold first. The data processing system 120 can also filter first data points based on a proximity to a location of a commercial entity. In one implementation, locations can be filtered may include comparing the location of a cluster's first data point, centroid data point, or a subsequent data point of the location cluster with a location of a commercial entity.

In one implementation, upon filtering the location clusters based on a duration threshold, the data processing system 120 can generate a set of valid clusters. In one implementation, the cluster filter 140 filters clusters based on proximity to a location of a commercial entity prior to filtering based on a duration threshold, in which case the data processing system 120 generates a set of valid clusters upon filtering based on a duration threshold and without performing further filtering. The set of valid clusters includes location clusters, e.g., generated by the cluster generator module 135, that also satisfy a threshold time, e.g., as determined by the cluster filter 140. In one implementation, the data processing system 120, e.g., via cluster filter 140, can further filter the set of valid clusters to identify a valid cluster. The data processing system 120 can also identify the entire set of valid clusters to be a valid cluster. In one implementation, the set of valid clusters may include a plurality of clusters associated with a plurality of locations of commercial entities associated with content items a user clicked on within a time period.

By filtering clusters based on location and a time duration, the data processing system 120 can identify one or more valid clusters, where the valid clusters indicate an activity at a commercial entity. The activity may indicate that a user spent a significant amount of time at or around a commercial entity (e.g., visited a store, browsed products at a store, saw a movie at a movie theater, watched a sports game, etc.). The activity may also indicate a user did not spend a significant amount of time at or around a commercial entity, e.g., drove by a store, walked by a store, went to a store for a very short period of time and then left (e.g., the store was closed), caught a cab near a store, waited at a public transportation stop near a store, etc.

Upon identifying the set of valid clusters based on a location and time duration of each cluster, the data processing system 120 can further filter the clusters in relation to a commercial entity to identify a valid cluster. The data processing system 120 may determine that there exist multiple valid clusters that are associated with a commercial entity, which may represent multiple store visits in a certain time period (e.g., the user visited a store multiple times in one day, adjacent days, during a week, or during a month). The data processing system 120 can make this determine by identifying a valid cluster associated with the first commercial entity 218, and then identifying a second valid cluster associated with the first commercial entity 218 that occurs at a later time (e.g., more than 4 hours apart, 12 hours apart, etc.). In one implementation, the data processing system 120 identifies the second valid cluster when the system identified intervening valid clusters at different locations or different commercial entities.

In one implementation, the data processing system 120 may identify a plurality of valid clusters all at a first commercial entity with no intervening valid clusters in a certain period of time. For example, the data processing system 120 may determine that a user works in a large department store, which may result in multiple valid clusters, but when combined, indicate that a user likely works at the department store rather than the user making multiple visits to the department store. In one implementation, the data processing system 120 determines the time and location of each valid cluster and further determines that there are no intervening clusters for a significant period of time (e.g., 4 hours, 6 hours, or 8 hours). The data processing system 120 may also determine based on multiple visits to a commercial entity on subsequent days that a user likely works at the commercial entity, or resides at or near the commercial entity, rather than visiting the commercial entity.

Figure 4:
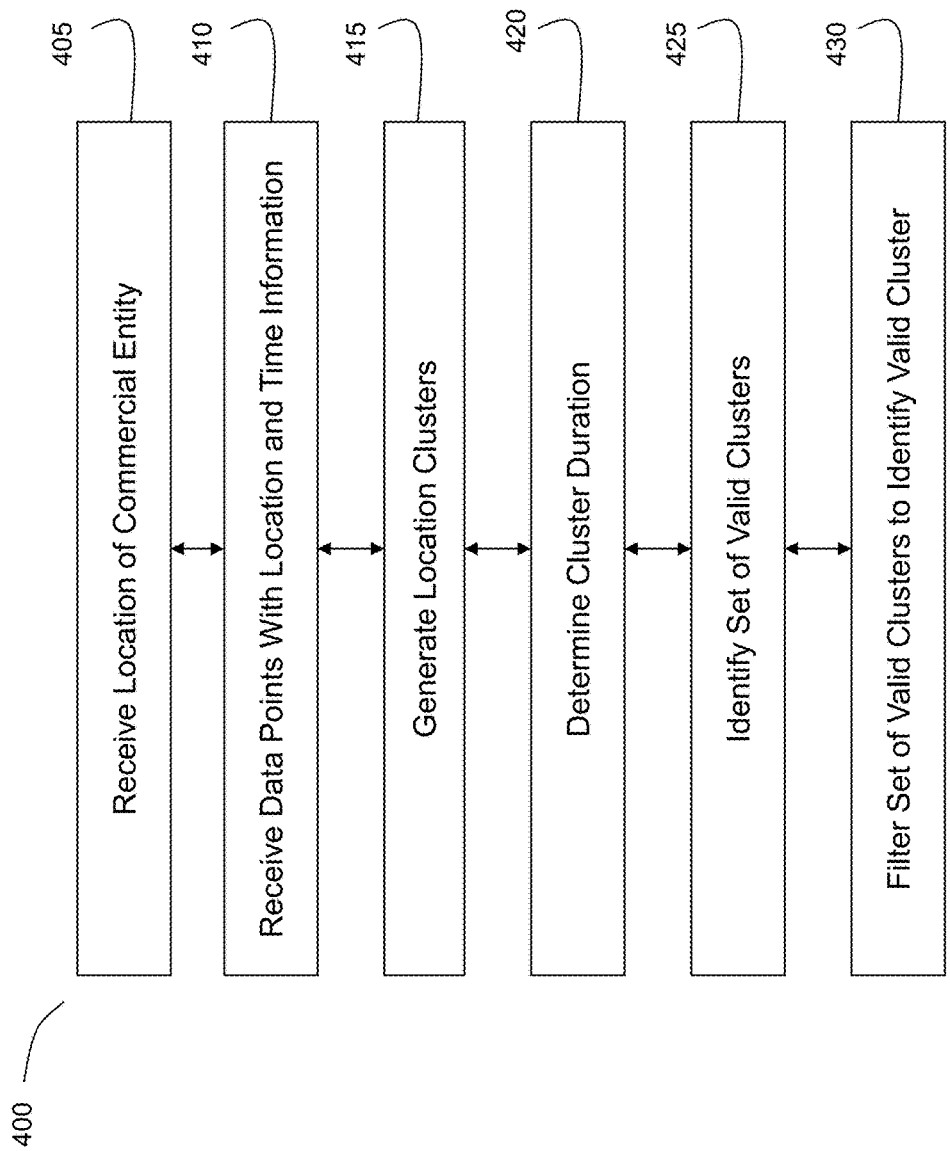
FIG. 4 is an illustration of one implementation of a method of generating a valid cluster based on a location of a commercial entity via a computer network
Figure 5:
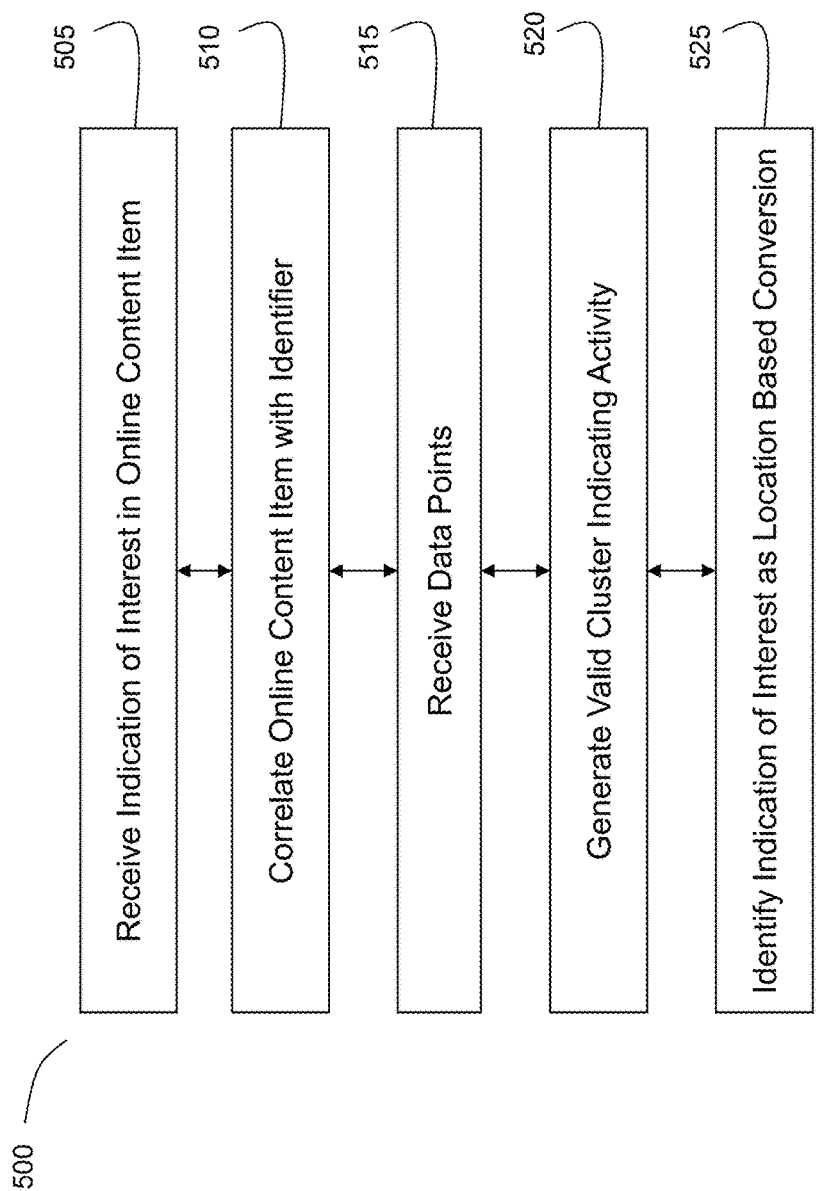
FIG. 5 is an illustration of one implementation of a method of determining a geographic location based conversion via a computer network.

FIG. 4 is a flow chart illustrating an example method 400 of generating valid clusters based on a location of a commercial entity via a computer network. The data processing system can use various techniques to generate a valid cluster. In one implementation, the method 400 includes receiving the location of the commercial entity (405). The method includes receiving a plurality of data points that each comprise location information and time information associated with a unique identifier associated with a user device (410). The method includes generating a plurality of location clusters (415). The method can include determining a cluster duration for each of the plurality of location clusters by evaluating the time information associated with data points of each of the plurality location clusters (420). The method includes comparing the cluster duration for each of the plurality of location clusters with a duration threshold to identify a set of valid location clusters that satisfy the duration threshold (425). In one implementation, the method includes filtering the set of valid clusters based on a proximity to the location of the commercial entity to identify the valid cluster, the valid cluster indicating an activity at the commercial entity (430).

In one implementation, the method 400 includes receiving a location of a commercial entity (405). For example, a data processing system receives or obtains the location of the commercial entity. The data processing system 120 can obtain the location from a content selection data structure that includes content items (e.g., online documents, online images, online advertisements), content groups (e.g., a plurality of online content items that have similar keywords and link to a same or related landing web page), and a content provider. The data processing system can obtain the location of the commercial identity responsive to receiving an indication of user interest with a content item associated with the commercial entity (e.g., a user clicking on an online advertisement for the commercial entity). In one implementation, the system may not generate a cluster unless an indication of user interest is received with respect to a content item of a commercial entity having a location stored in a content selection data structure. The method can include identifying the indication of user interest and storing the indication of interest, along with a unique user identifier associated with the indication of user interest.

In one implementation, the method 400 includes receiving a plurality of data points (410). The method can include a data processing system (e.g., via a geographic location module) receiving the plurality of data points via a computer network from a remote user device associated with the unique identifier. The data points can include location information (such as latitude and longitude coordinates), or the data processing system can determine location information based on information in the data point (e.g., distance from a reference point such as a cell phone tower). The data point can also include time information (e.g., a timestamp) or the method may include determining time information based on a receive time of the data point.

In one implementation, the method 400 can include generating multiple location clusters (415). For example, a data processing system can generate multiple location clusters based on the location information. Each location cluster can include a first data point (or an initial or centroid data point) and subsequent data points. The method can include generating the location cluster based upon the distance from the first received data point in the current cluster. A subsequent data point may be included in the current cluster if the distance between the subsequent data point and the first received data point is within a distance threshold. If a subsequent data point does not satisfy a distance threshold, the method can include including the subsequent data point in the current cluster and generating a new cluster where the subsequent data point is the new first received data point.

In one implementation, the method 400 includes generating location clusters using different distance thresholds. In one implementation, a first threshold distance can be used to generate a first set of clusters while a second threshold distance is used to generate a second set of clusters. In one implementation, the method includes identifying the minimum distance threshold of a set of possible distance thresholds that can be satisfied by the first subsequent data point. The data processing system can use the identified distance threshold to identify the remaining data points in the current cluster. Upon identifying data point that does not satisfy the identified distance threshold, the data processing system can initiate a new cluster and repeat the process of identifying a minimum distance threshold of a set of distance thresholds that the new first subsequent data point satisfies.

In one implementation, the method 400 includes determining a cluster duration (420). A data processing system can determine a cluster duration based on the time information of one or more data points of the cluster. In one implementation, the method includes determining a time duration of a cluster by determining the amount of time between the first received data point and the last received data point of the cluster.

In one implementation, the method 400 includes identifying a set of valid clusters (425). The method can include identifying, by a data processing system, the set of valid clusters (e.g., via a cluster filter). In one implementation, the method includes comparing the cluster duration of each of the multiple location clusters with a duration threshold to identify a set of valid location clusters that satisfy the duration threshold. The duration threshold can be a predetermined value, a minimum and maximum value, or a threshold determined via a histogram analysis technique.

FIG. 4 is an implementation of a method 500 for determining a geographic location based conversion via a computer network. The method 500 includes a data processing system receiving an indication of user interest in an online content item (505). The indication of user interest can include a click on an online content item, such as an advertisement, document or other online content item. The data processing system can receive the indication via an interface via a computer network. The method includes correlating the online content item with an identifier (510). In one implementation, the data processing system may receive an identifier along with the indication of user interest (e.g., a cookie, a username, or identifier). The data processing system can also send a request for a user identifier (e.g., for a cookie or username). Responsive to receiving the user identifier, the data processing system (e.g., via a performance tracker) can correlate the online content item with the identifier or otherwise stores or logs information about the identifier associated with the indication of interest.

In one implementation, the method 500 includes receiving data points from a user device corresponding to the identifier associated with the indication of interest with the content item (515). For example, the data processing system can receive data points that are not just associated with the click on the content item, and then filter the data points accordingly. In one implementation, the data processing system may not filter the data points based on indication of user interest until the data processing system generates a location cluster or a valid cluster.

In one implementation, the method 500 includes generating a valid cluster indicating an activity at or around a commercial entity (520). For example, the data processing system (e.g., via a cluster generator or cluster filter) can generate the valid cluster. In one implementation, the data processing system can filter the valid clusters based on the location of the commercial entity that provided or is otherwise associated with the content item for which the data processing system received an indication of user interest from a user device corresponding to the same identifier as the data points.

In one implementation, the method 500 includes identifying the indication of interest as a location based conversion (525). For example, the data processing system (e.g., via a performance tracker) can identify the indication of interest as a location based conversion. In one implementation, the data processing system matches an identifier associated with the valid cluster (e.g., an identifier associated with an online account of a user of a user device that provided that data points or location pings) with the same identifier associated with the click on the content item. In some implementations, these may be two different user devices associated with the same identifier (e.g., a user logged into an account using the same username on both devices), or the same user device.

The data processing system can use additional factors to determine whether the indication of user interest and subsequent valid cluster a geographic location based conversion. In one implementation, a factor may include the difference in time between when a user last clicked on the content item and the timestamp of the valid cluster. If the time difference is greater than a week, a month, or some other time interval, the data processing system may determine that this is not a valid location based conversion. Additional factor can also include the amount of time spent at or around the commercial entity. In one implementation, the data processing system may identify the store visit as a valid location based conversion if the duration of the valid cluster exceeds a duration threshold (e.g., 5 minutes, 10 minutes, 30 minutes, etc.). In one implementation, a content provider may adjust or provide the one or more factors used to determine a valid location based conversion.

FIG. 6 illustrates one implementation of a graphical user interface for a report 600 generated by the data processing system. The report can be categorized by various campaigns include a company's brand campaign 604, inventory campaign 605 and event campaigns 606. The report 600 can be interactive and include a plurality of views 640 including, e.g., store visits, campaigns 602 (selected), ad groups, settings, ads, keywords, ad extensions. The report can be based on offline information and provide an indication that it is based on offline information 608. The graphical user interface for the report 600 can include adjustable settings and a button 614 to access the settings. In the store visits view, the report can include performance metrics based on location based conversion. In one implementation, the report categories the performance metrics based on the campaign 616, which, in this implementation, includes brand 630, inventory 632, events 634, local 636, and online store 638. For each of the campaigns 630-638, the data processing system provides various metrics including, e.g., clicks 618, impressions 620, click through rate 622, average cost per click 624, estimated store visits 626 and offline visit rate.

The data processing system 120 can aggregate the metrics and report the metrics upon determining that a sufficient number of users visited a store, thereby maintaining user privacy. The clicks 618 can correspond to indication of user interest associated with a content item associated with the content campaign 630-638. The impressions 620 can correspond to the number of times a content item associated with a content item associated with the content campaign 630-638 was displayed on a user device (unique displays or non-unique displays). The click through rate 622 can indicate the number of times the user clicked or otherwise expressed interest in the content item divided by the number of impressions (e.g., clicks/impressions). The average cost per click 624 indicates the amount the content provider paid for each click (e.g., based on an online content selection auction, bidding on keywords, etc.). The estimated store visits 626 represents the location based conversions identified by the data processing system using the systems and methods disclosed herein. The offline visit rate 628 can represents the number of location based conversions with respect to the number of clicks or impressions.

In one implementation, the data processing system 120 can provide performance metrics using one or more of the following formulas: an in-store visit rate 628 (number of unique users visited/number of clicks eligible for location measurement); visits/clicks (number of visits/number of users clicks); estimated clicks visited (in-store visited rate*number of total clicks (eligible & ineligible); or estimated store visits 626 ([visits/clicks]*number of total clicks (eligible & ineligible).

The data processing system 120 can provide content providers with anonymous and aggregated view of the store visits that their ad campaign caused. In some implementations, the content provider 125 cannot access get location based conversion data for a single user or a small group of users with this attribution data. The data processing system 120 can limit this feature to advertisers that have at least a certain number of stores (over one square kilometer area geographically) with more than a certain number of active, unique users seen by the data processing system 120 per day per location. This data can be further obscured from the content providers 125 because the data processing system 120 may share the percentage of users for whom the data processing system 120 observed a location based conversion out of the total users the data processing system 120 could measure location based conversions for who also clicked on a content item in the past 30, for example, days. Thus, the data processing system 120 can ensure that location user data is reported to content providers 125 in an anonymous fashion.

FIG. 7 is an illustration of one implementation of a graphical user interface 700 for generating a performance report based on location based conversions and adjusting settings or parameters. For example, different advertisers may have different goals for their reporting. Some advertisers may run big box stores with relatively large footprints and some may run small stores based in densely populated locations. The desired accuracy and value of the related store visit data may change depending on the unique constraints of an advertiser or content provider or commercial entity. Accordingly, the settings menu 702 can includes various settings associated with location based conversions. In some implementations, the data processing system 120 can predetermine one or more settings or the content provider 125 can adjust one or more settings. In some implementations, the data processing system 120 can automatically optimize settings based on various optimization techniques, including, e.g., histogram analysis or feedback from the content provider 125.

In one implementation, the settings menu 700 can be interactive and include a plurality of parameters used for identifying location based conversions 702. The settings for identifying a valid cluster as a store visit 702 can include whether to treat store visits as conversions 704 (e.g., enable location based conversions for a specific content item, content group, content campaign or commercial entity). In one implementations, the adjustable parameters can include a time parameter and a distance parameter. In one implementation, the settings 702 can include the minimum number of minutes a user device must be present in a store to count as a conversion, which can be adjusted via a text box 706 or up-down buttons 708. This minimum time may be used by the data processing system as a duration threshold or a minimum duration threshold to filter out data points or location clusters or the set of valid clusters to identify a valid cluster for a location based conversion. The settings menu 702 can further include a setting for a radius around a store within which the data processing system 120 can identify a location of a valid cluster as a visit to the store 710. In one implementation, the data processing system 120 can provide fixed settings such as 50 meters (712), 100 meters (714), or 200 meters (716). In one implementation, the data processing system 120 can include an input text box or drop down menu or up-down arrows to manipulate the radius parameter. Upon setting the one or more parameters, the content provider 125 can save the settings by selecting save 718.

Figure 8:
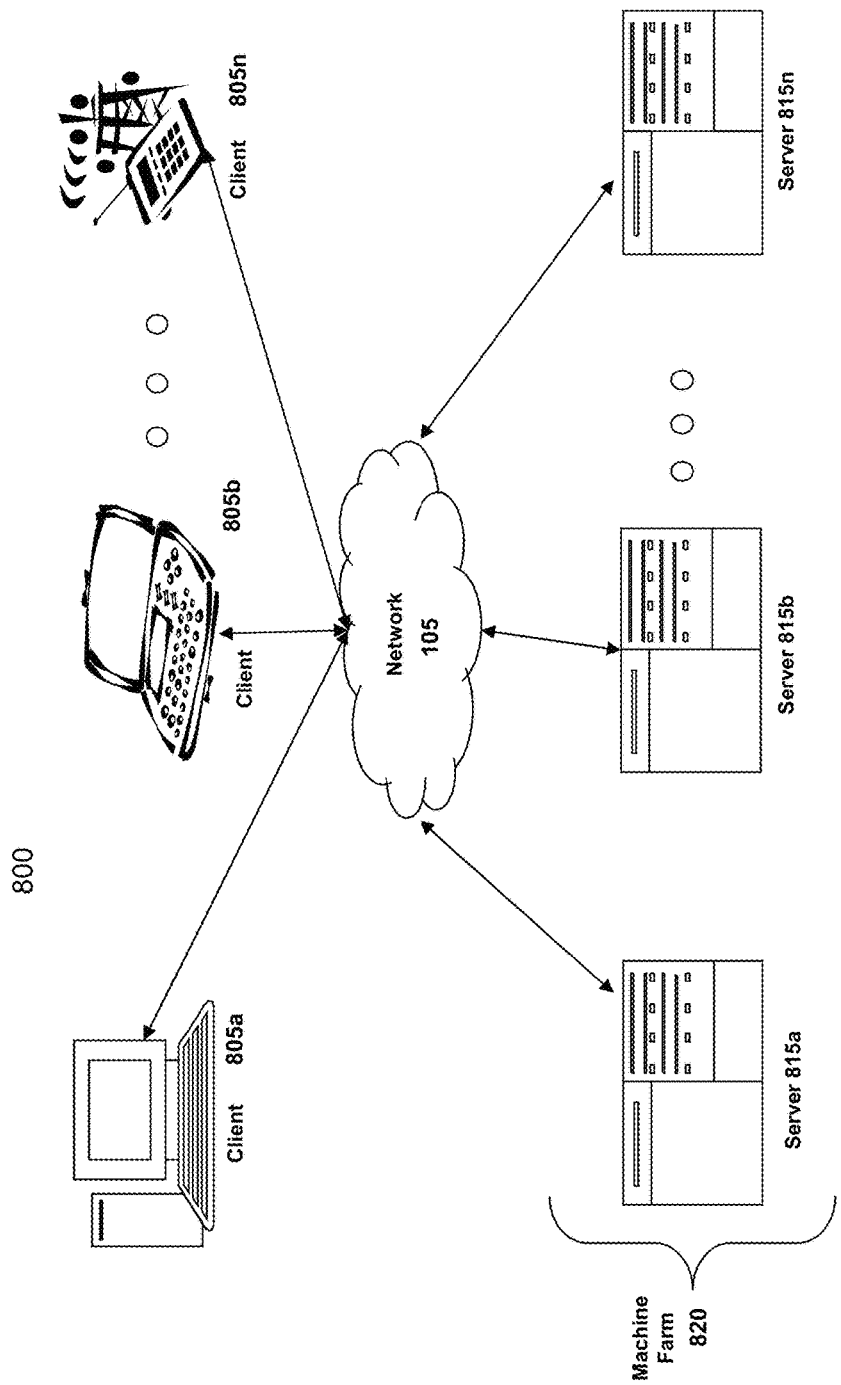
FIG. 8 shows one implementation of a network environment comprising client machines in communication with remote machines.

The system 100 and its components, such as a data processing system 120, may include hardware elements, such as one or more processors, logic devices, or circuits. FIG. 8 illustrates an implementation of a network environment 800. The system 100 and method 400 can operate in the network environment 800 depicted in FIG. 8. In brief overview, the network environment 800 includes one or more clients 805 that can be referred to as local machine(s) 805, client(s) 805, client node(s) 805, client machine(s) 805, client computer(s) 805, client device(s) 805, endpoint(s) 805, or endpoint node(s) 805) in communication with one or more servers 815 that can be referred to as server(s) 815, node 815, or remote machine(s) 815) via one or more networks 105. In some implementations, a client 805 has the capacity to function as both a client node seeking access to resources provided by a server and as a server providing access to hosted resources for other clients 805.

Although FIG. 8 shows a network 105 between the clients 805 and the servers 815, the clients 805 and the servers 815 may be on the same network 105. The network 105 can be a local-area network (LAN), such as a company Intranet, a metropolitan area network (MAN), or a wide area network (WAN), such as the Internet or the World Wide Web. In some implementations, there are multiple networks 105 between the clients 105 and the servers 815. In one of these implementations, the network 105 may be a public network, a private network, or may include combinations of public and private networks.

The network 105 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some implementations, the network 105 may include a wireless link, such as an infrared channel or satellite band. The topology of the network 105 may include a bus, star, or ring network topology. The network may include mobile telephone networks utilizing any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). In some implementations, different types of data may be transmitted via different protocols. In other implementations, the same types of data may be transmitted via different protocols.

In some implementations, the system 100 may include multiple, logically-grouped servers 815. In one of these implementations, the logical group of servers may be referred to as a server farm 820 or a machine farm 820. In another of these implementations, the servers 815 may be geographically dispersed. In other implementations, a machine farm 820 may be administered as a single entity. In still other implementations, the machine farm 820 includes a plurality of machine farms 820. The servers 815 within each machine farm 820 can be heterogeneous—one or more of the servers 815 or machines 815 can operate according to one type of operating system platform.

In one implementation, servers 815 in the machine farm 820 may be stored in high-density rack systems, along with associated storage systems, and located in an enterprise data center. In this implementation, consolidating the servers 815 in this way may improve system manageability, data security, the physical security of the system, and system performance by locating servers 815 and high performance storage systems on localized high performance networks. Centralizing the servers 815 and storage systems and coupling them with advanced system management tools allows more efficient use of server resources.

The servers 815 of each machine farm 820 do not need to be physically proximate to another server 815 in the same machine farm 820. Thus, the group of servers 815 logically grouped as a machine farm 820 may be interconnected using a wide-area network (WAN) connection or a metropolitan-area network (MAN) connection. In one implementation, a machine farm 820 may include servers 815 physically located in different continents or different regions of a continent, country, state, city, campus, or room. Data transmission speeds between servers 815 in the machine farm 820 can be increased if the servers 815 are connected using a local-area network (LAN) connection or some form of direct connection. Additionally, a heterogeneous machine farm 820 may include one or more servers 815 operating according to a type of operating system, while one or more other servers 815 execute one or more types of hypervisors rather than operating systems. In these implementations, hypervisors may be used to emulate virtual hardware, partition physical hardware, virtualize physical hardware, and execute virtual machines that provide access to computing environments.

Management of the machine farm 820 may be de-centralized. In one implementation, one or more servers 815 may comprise components, subsystems and circuits to support one or more management services for the machine farm 820. In one of these implementations, one or more servers 815 provide functionality for management of dynamic data, including techniques for handling failover, data replication, and increasing the robustness of the machine farm 820. Each server 815 may communicate with a persistent store and, in some implementations, with a dynamic store.

Server 815 may include a file server, application server, web server, proxy server, appliance, network appliance, gateway, gateway, gateway server, virtualization server, deployment server, secure sockets layer virtual private network ("SSL VPN") server, or firewall. In one implementation, the server 815 may be referred to as a remote machine or a node.

The client 805 and server 815 may be deployed as or executed on any type and form of computing device, such as a computer, network device or appliance capable of communicating on any type and form of network and performing the operations described herein.

Figure 9:
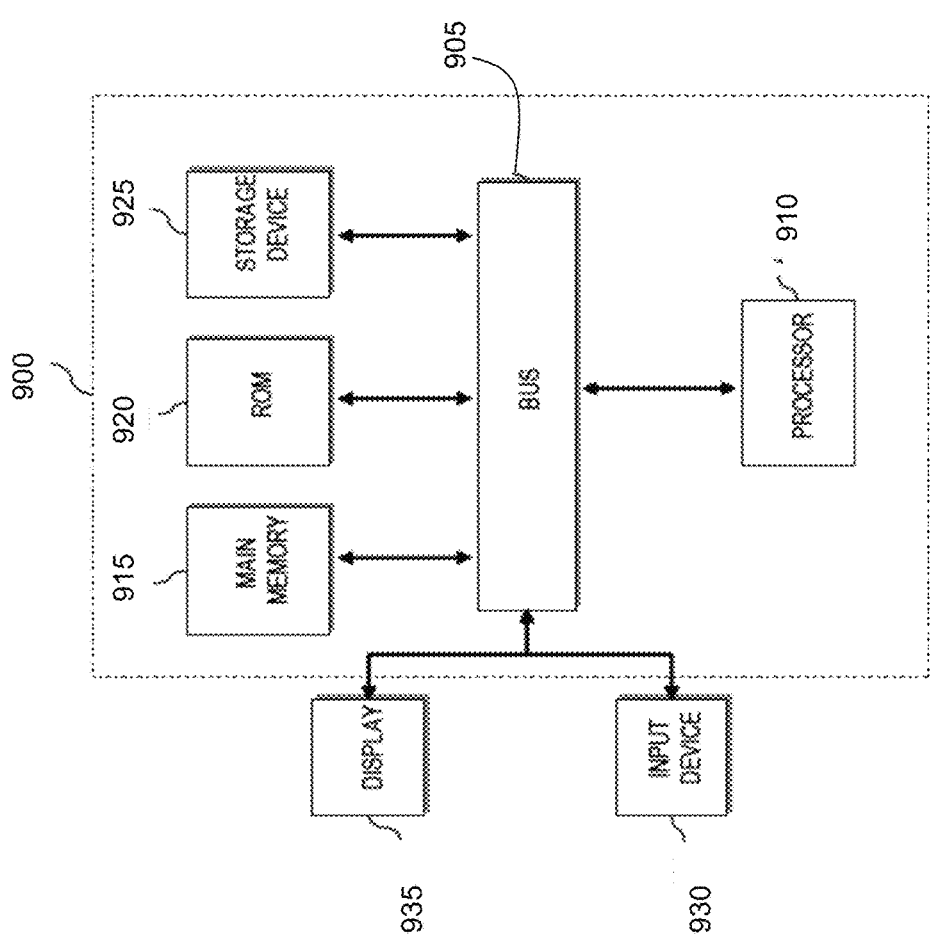
FIG. 9 is a block diagram illustrating a general architecture for a computer system that may be employed to implement various elements of the systems and methods described herein, in accordance with an implementation.

FIG. 9 is a block diagram of a computing system 900 in accordance with an illustrative implementation. The computing system or computing device 900 can be used to implement the system 100, content provider 125, user device 110, web site operator 115, data processing system 120, geographic location module 130, cluster generator module 135, cluster filter 140, performance tracker module 145 and database 150. The computing system 900 includes a bus 905 or other communication component for communicating information and a processor 910 or processing circuit coupled to the bus 905 for processing information. The computing system 900 can also include one or more processors 910 or processing circuits coupled to the bus for processing information. The computing system 900 also includes main memory 915, such as a random access memory (RAM) or other dynamic storage device, coupled to the bus 905 for storing information, and instructions to be executed by the processor 910. Main memory 915 can also be used for storing position information, temporary variables, or other intermediate information during execution of instructions by the processor 910. The computing system 900 may further include a read only memory (ROM) 920 or other static storage device coupled to the bus 905 for storing static information and instructions for the processor 910. A storage device 925, such as a solid state device, magnetic disk or optical disk, is coupled to the bus 905 for persistently storing information and instructions.

The computing system 900 may be coupled via the bus 905 to a display 935, such as a liquid crystal display, or active matrix display, for displaying information to a user. An input device 930, such as a keyboard including alphanumeric and other keys, may be coupled to the bus 905 for communicating information and command selections to the processor 910. In another implementation, the input device 930 has a touch screen display 935. The input device 930 can include a cursor control, such as a mouse, a trackball, or cursor direction keys, for communicating direction information and command selections to the processor 910 and for controlling cursor movement on the display 935.

According to various implementations, the processes described herein can be implemented by the computing system 900 in response to the processor 910 executing an arrangement of instructions contained in main memory 915. Such instructions can be read into main memory 915 from another computer-readable medium, such as the storage device 925. Execution of the arrangement of instructions contained in main memory 915 causes the computing system 900 to perform the illustrative processes described herein. One or more processors in a multi-processing arrangement may also be employed to execute the instructions contained in main memory 915. In alternative implementations, hard-wired circuitry may be used in place of or in combination with software instructions to effect illustrative implementations. Thus, implementations are not limited to any specific combination of hardware circuitry and software.

Although an example computing system has been described in FIG. 9, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, i.e., one or more circuits of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices).

The operations described in this specification can be performed by a data processing apparatus on data stored on one or more computer-readable storage devices or received from other sources.

The term "data processing apparatus" or "computing device" encompasses various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a circuit, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more circuits, sub programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products.

References to "or" may be construed as inclusive so that any terms described using "or" may indicate any of a single, more than one, and all of the described terms.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method of determining a geographic location based conversion via a computer network, comprising:
   receiving, by a data processing system having at least one processor, via the computer network from a first computing device, an indication of interest in an online content item, the online content item associated with a commercial entity having a location identified in an online content selection data structure;
   correlating, by the data processing system, the online content item with a unique identifier associated with an application executing on the first computing device;
   receiving, by the data processing system, via the computer network from the first computing device, a plurality of data points that each comprise time information and location information of the first computing device;
   comparing the time information and the location information of a first data point of the plurality of data points and the time information and the location information of second data points of the plurality of data points with a minimum location cluster duration threshold, a maximum location cluster duration threshold, and a location threshold to:
  filter out a first false positive data point that is below the minimum location cluster duration threshold based on the comparing the time information and the location information of the first data point and the time information and the location information of the second data points; and
  filter out a second false positive data point that is above the maximum location cluster duration threshold based on the comparing the time information and the location information of the first data point and the time information and the location information of the second data points;
generating, by the data processing system, a valid location cluster without the first false positive data point and the second false positive data point by comparing a location of the first data point of the plurality of data points with respective locations of the second data points of the plurality of data points, each of the plurality of data points indicating the location information of the first computing device associated with the unique identifier via the application, the valid location cluster indicating an activity at the location of the commercial entity based on evaluations of the time information and the location information of the first data point of the plurality of data points and the time information and the location information of the second data points of the plurality of data points with the minimum location cluster duration threshold, the maximum location cluster duration threshold, and the location threshold to filter out the first false positive data point that is below the minimum location cluster duration threshold and the second false positive data point that is above the maximum location cluster duration threshold; and
using the valid location cluster to identify the indication of interest in the online content item as the location based conversion based on the activity at the location of the commercial entity.

2. The method of claim 1, wherein receiving the plurality of data points comprises:
  receiving, by the data processing system from the first computing device, the plurality of data points via the application executing on the first computing device.

3. The method of claim 1, comprising:
  receiving, by the data processing system, via the computer network from a second computing device executing the application associated with a second unique identifier, a second plurality of data points that each comprise location information of the second computing device.

4. The method of claim 1, wherein receiving the indication of interest comprises:
  receiving, via the computer network from the first computing device, an indication of at least one of a click and an impression.

5. The method of claim 1, comprising:
  transmitting, by the data processing system responsive to receiving the indication of interest from the first computing device, a request for an indication of the unique identifier; and
  receiving, by the data processing system responsive to the request, the indication of the unique identifier from the first computing device.

6. The method of claim 1, comprising:
  generating, by the data processing system, a plurality of valid location clusters indicating the activity at the location of the commercial entity;
  determining, from the plurality of valid location clusters, a plurality of occurrences of the activity at the location of the commercial entity; and
  identifying, by the data processing system, the indication of interest in the online content item as multiple location based conversions per indication of interest.

7. The method of claim 1, comprising:
  receiving, by the data processing system, via the computer network from the first computing device, the first data point;
  comparing, by the data processing system, a location of a subsequent data point of the plurality of data points with the location information of the first data point to determine that the subsequent data point satisfies the location threshold; and
  comparing, by the data processing system, a time of the subsequent data point of the plurality of data points with the time information of the first data point to determine that the subsequent data point satisfies the minimum location cluster duration threshold and the maximum location cluster duration threshold.

8. The method of claim 1, wherein generating the valid location cluster comprises:
  generating, by the data processing system and based on the location information, the valid location cluster indicating a visit to the commercial entity.

9. The method of claim 8, comprising:
  identifying, by the data processing system, a keyword associated with the online content item; and
  generating a report for the keyword.

10. The method of claim 1, comprising:
  aggregating, by the data processing system, for a plurality of identifiers, a plurality of identified location based conversions;
  determining that the plurality of identified location based conversions satisfies a privacy threshold; and
  generating, by the data processing system, a report indicating a location based conversion rate for the online content item.

11. The method of claim 1, comprising:
  receiving, from a plurality of computing devices including the first computing device, a plurality of indications of interest in a plurality of online content items of the commercial entity, the plurality of indications of interest associated with a plurality of identifiers;
  aggregating, by the data processing system, for the plurality of identifiers, a plurality of identified location based conversions;
  determining that the plurality of identified location based conversions satisfies a privacy threshold; and
  generating, by the data processing system, a report indicating a location based conversion rate for the plurality of online content items of the commercial entity.

12. The method of claim 1, comprising:
  identifying, by the data processing system, a false indication of interest in the online content; and
  filtering out, by the data processing system, an identifier associated with the false indication of interest by excluding data points associated with the identifier from the valid location cluster.

13. The method of claim 1, comprising:
  determining a centroid data point based on the location of the first data point of the plurality of data points and the respective locations of the second data points of the plurality of data points; and identifying the valid location cluster based on the centroid data point.

14. A system for determining a geographic location based conversion via a computer network, comprising:

a data processing system comprising at least one processor, the data processing system configured to:

receive, via the computer network from a first computing device, an indication of interest in an online content item, the online content item associated with a commercial entity having a location identified in an online content selection data structure;

correlate the online content item with a unique identifier associated with an application executing on the first computing device;

receive, via the computer network from the first computing device, a plurality of data points that each comprise time information and location information of the first computing device;

compare the time information and the location information of a first data point of the plurality of data points and the time information and the location information of second data points of the plurality of data points with a minimum location cluster duration threshold, a maximum location cluster duration threshold, and a location threshold to:

filter out a first false positive data point that is below the minimum location cluster duration threshold based on the comparing the time information and the location information of the first data point and the time information and the location information of the second data points; and filter out a second false positive data point that is above the maximum location cluster duration threshold based on the comparing the time information and the location information of the first data point and the time information and the location information of the second data points;

generate a valid location cluster by comparing a location of the first data point of the plurality of data points with locations of the second data points of the plurality of data points, each of the plurality of data points indicating the location information of the first computing device associated with the unique identifier via the application, the valid location cluster indicating an activity at the location of the commercial entity based on respective comparisons of the time information and the location information of the first data point of the plurality of data points and the time information and the location information of the second data points of the plurality of data points with a minimum location cluster duration threshold, a maximum location cluster duration threshold, the location threshold to filter out the first false positive data point that is below the minimum location cluster duration threshold and the second false positive data point that is above the maximum location cluster duration threshold; and identify the indication of interest in the online content item as the location based conversion based on the activity at the location of the commercial entity.

15. The system of claim 14, comprising:

the data processing system configured to receive, from the first computing device, the plurality of data points via the application executing on the first computing device.

16. The system of claim 14, comprising:

the data processing system configured to receive, from a second computing device executing the application associated with the unique identifier, a second plurality of data points that each comprise location information of the second computing device.

17. The system of claim 14, comprising the data processing system configured to:

generate a plurality of valid location clusters indicating the activity at the location of the commercial entity, the plurality of valid location clusters indicating a plurality of occurrences of the activity at the location of the commercial entity; and identify the indication of interest in the online content item as multiple location based conversions per indication of interest.

18. The system of claim 14, comprising the data processing system configured to:

receive, via the computer network from the first computing device, the first data point, the first data point comprising location information and time information;

compare a location of a subsequent data point of the plurality of data points with location information of the first data point to determine that the subsequent data point satisfies the location threshold; and compare, a time of the subsequent data point of the plurality of data points with time information of the first data point to determine that the subsequent data point satisfies the minimum location cluster duration threshold and the maximum location cluster duration threshold.

19. The system of claim 14, comprising the data processing system configured to:

aggregate for a plurality of identifiers, a plurality of identified location based conversions;

determine that the plurality of identified location based conversions satisfies a privacy threshold; and generate a report indicating a location based conversion rate for the online content item.

20. The system of claim 14, comprising the data processing system configured to:

receive, from a plurality of computing devices including the first device, a plurality of indications of interest in a plurality of online content items of the commercial entity, the plurality of indications of interest associated with a plurality of identifiers;

aggregate, for the plurality of identifiers, a plurality of identified location based conversions;

determine that the plurality of identified location based conversions satisfies a privacy threshold; and generate a report indicating a location based conversion rate for the plurality of online content items of the commercial entity.

21. A non-transitory computer-readable medium comprising processor executable instructions to determine a geographic location based conversion via a computer network, the instructions comprising instructions to:

receive, via a computer network from a first computing device, an indication of interest in an online content item, the online content associated with a commercial entity having a location identified in an online content selection data structure;

correlate the online content item with an identifier associated with the first computing device;

receive, via the computer network from the first computing device, a plurality of data points that each comprise time information and location information of the first computing device;

comparing the time information and the location information of a first data point of the plurality of data points and the time information and the location information of second data points of the plurality of data points with a minimum location cluster duration threshold, a maximum location cluster duration threshold, and a location threshold to:
- filter out a first false positive data point that is below the minimum location cluster duration threshold based on the comparing the time information and the location information of the first data point and the time information and the location information of the second data points; and
- filter out a second false positive data point that is above the maximum location cluster duration threshold based on the comparing the time information and the location information of the first data point and the time information and the location information of the second data points;

generate a valid location cluster indicating an activity at the location of the commercial entity based on a comparison of a location of the first data point of the plurality of data points with respective locations of the second data points of the plurality of data points, each of the plurality of data points indicating the location information of the first computing device associated with the identifier, the comparison satisfying the minimum location cluster duration threshold, the maximum location cluster duration threshold, and the location threshold to filter out the first false positive data point that is below the minimum location cluster duration threshold and the second false positive data point that is above the maximum location cluster duration threshold; and identify the indication of interest in the online content item as the location based conversion.

\* \* \* \* \*